(12) United States Patent
Rojas Romero

(10) Patent No.: US 6,757,185 B2
(45) Date of Patent: Jun. 29, 2004

(54) METHOD AND CONTROL CIRCUITRY FOR A THREE-PHASE THREE-LEVEL BOOST-TYPE RECTIFIER

(75) Inventor: Manuel Roberto Rojas Romero, Sao José Dos Campos (BR)

(73) Assignee: E.E.S. Sistemas de Energia Ltda., San Paulo (BR)

( * ) Notice: Subject to any disclaimer, the term of this patent is extended or adjusted under 35 U.S.C. 154(b) by 0 days.

(21) Appl. No.: 10/168,438

(22) PCT Filed: Dec. 22, 2000

(86) PCT No.: PCT/BR00/00144

§ 371 (c)(1),
(2), (4) Date: Oct. 18, 2002

(87) PCT Pub. No.: WO01/47094

PCT Pub. Date: Jun. 28, 2001

(65) Prior Publication Data

US 2003/0128563 A1 Jul. 10, 2003

(30) Foreign Application Priority Data

Dec. 22, 1999 (BR) .............................. 9907351

(51) Int. Cl.[7] .............................................. H02M 7/217
(52) U.S. Cl. ...................................................... 363/89
(58) Field of Search ............................ 363/84, 86, 87, 363/89

(56) References Cited

U.S. PATENT DOCUMENTS 5,621,628 A * 4/1997 Miyazaki et al. .............. 363/89
5,742,493 A * 4/1998 Ito et al. ....................... 363/89
6,459,596 B1 * 10/2002 Corzine ........................ 363/89

OTHER PUBLICATIONS

Ide P et al: "Investigation of Low Cost Control Schemes for a Selected 3–Level Switched Mode Rectifier" Intelec. International Telecomunications Energy Conference, US, New York, NY: IEEE, Jul. 1997, pp. 413–418, XP000800932, ISBN: 0–7803–3997–5, cited in the application, the whole document.

Nishida Y et al: "A Simplified Discontinuous–Switching–Modulation for Three–Phase Current–FED PFC–Converters and Experimental Study for the Effects", Annual Applied Power Electronics Conference and Exposition (APEC), US, New York, IEEE, vol. Conf. 11, Mar. 3, 1996, pp. 552–558, XP000585901, ISBN: 0–7803–3045–5, the whole document.

Sakutaro Nonaka et al: "Single–Phase Composite PWM Voltage Source Converter", Conference Record of the Industry Applications Conference IAS Annual Meeting, US, New York, IEEE, vol. Conf. 29, Oct. 2, 1994, pp. 761–768, XP000512462, ISBN: 0–7803–1994–X, the whole document.

Gules R et al: "Switched–Mode Three–Phase Three–Level Telecommunications Rectifier", Copenhagen, Jun. 6–9, 1999, New York, NY: IEEE, US, Jun. 6, 1999, pp. 29–3–01–07, XP 000868436, ISBN: 0–7803–5625–X, cited in the application, the whole document.

International Search Report—PCT/BR00/00144, ISA/EPO, Jun. 21, 2001.

* cited by examiner

Primary Examiner—Jeffrey Sterrett
(74) Attorney, Agent, or Firm—Harness, Dickey & Pierce, PLC

(57) ABSTRACT

A synchronized control method for a three-phase three-level boost-type rectifier with reduced input current ripple and balanced output voltages is disclosed. The proposed control allows simplifying the control circuit as much as possible without compromising the rectifier performance. In fact, besides simplicity, the control method featured synchronized command signals to de switching devices, minimized input current ripple, full controllability of the output voltage, dynamic balance of the output center point, constant switching frequency, simplified design of EMC filters, good transient and steady state performance, and low cost. The invention described first the most important configurations that the three-phase three-level boost-type rectifier may assume and studied the converter's operation. The concept involved for output voltage, input current, neutral point balance and control system design was presented.

12 Claims, 17 Drawing Sheets

Vector of group "a" ($\bar{a}_6$ PNP)

Vector of group "b" ($\bar{b}_6$ PNO)

Vector of group "c" ($\bar{c}_6$ POP)

Vector of group "d" ($\bar{d}_6$ ONO)

Vector of group "z" ($\bar{z}_2$ OOO)

(a)

(b)

METHOD AND CONTROL CIRCUITRY FOR A THREE-PHASE THREE-LEVEL BOOST-TYPE RECTIFIER

I—TECHNICAL BACKGROUND

1 Technical Field

The present invention is related to the electrical rectifier field, more specifically, to the field of control techniques for the three-phase three-level boost type rectifier.

This work introduces a new control method and control circuit for a three-phase three-level boost-type rectifier. Under the proposed control method and control circuit, the rectifier performs three-phase AC-DC conversion generating sinusoidal input currents with reduced ripple and near unity power factor while balancing the two DC output voltages. The control circuit uses two triangular carriers with the same amplitude but 180 degrees phase-shifted; Trg1 is used during the positive halve cycle and Trg2 for the negative one. The advance of the method is that the switching pulses are synchronized and appropriately distributed, allowing the reduction of the input current ripple. An effective balance of the output voltage is obtained by adding a sensor that acts over the input current waveform reference. In addition, the control system features simplicity and low cost.

2 Background

With the development of power electronics technology and the generalized utilization of equipment with non-linear characteristics such as electronic rectifiers or static converters AC-DC, there have been increasing utility pollution problems produced by large distorted harmonics currents drawn from the power distribution systems [See P. Rioual and T. Deflandre, "Impact on the Distribution and Transmission Systems of Harmonic Current Injection due to Capacitive Load Rectifiers in Commercial, Residential and Industrial Installations", Conference Records of EPE'95, pp. 3.503–3.508, 1985, and Yu-Kang Lo and Neng-Chin Lia, "On Evaluating the Input Current Distortion with Current Slopes for Single-Phase Switch-Mode Rectifiers", Conference records of PESC'98, pp. 77–80, 1998]. Harmonic currents cause additional harmonic losses in the utility system and may excite electrical resonances, leading to large overvoltages; thus disturbing other sensitive loads connected to the same supply [See Ned Mohan, Tore M. Undeland, William P. Robbins, "Power Electronics Converters, Applications, and Design", John Wiley & Sons, 1989].

The uncontrolled and thyristor bridge rectifiers are widely used interface between utility and power electronics systems. Although they are very simple in structure and robust in operation, they have the disadvantages of drawing a large amount of harmonic current from utility [See Hirofumi Akagi, "New Trends in Active Filters for Power Conditioning", IEEE Transactions on Industry Applications, Vol. 32, No. 6, pp. 1312–1322, 1996]. Recently the harmonics produced by such nonlinear loads have become a serious problem in many countries.

To prevent the problem to become intolerable, various standards and guidelines such as the IEEE 519 and the IEC-555, have been established which specifies limits on the magnitudes of harmonic currents and harmonic voltage distortion at various frequencies [Ned Mohan et al., op. cit.]. Simultaneously, much effort has been carried out to develop power converters with low harmonic current injection to utility and capable to control the input power factor.

Modern AC-DC converters are expected to draw sine-wave current from the mains, with power factor very close to unity. In other words it is required that the converter presents a resistive load to the mains [Javier Sebastian and Miguel Jaureguizar, "Tendencias Futuras en la Corrección del Factor de Potencia en Sistemas de Alimentación", Conference records of CIEP'93, pp. 136–153, 1993]. In general, besides those characteristics, the target is low circuit complexity, low component stress, high power density, high efficiency, high reliability, and controllability of the output voltage.

In single-phase applications, one of the most popular power circuit schemes for power factor correction is the boost converter topology. A frond-end rectifier diode bridge followed by a boost DC-DC converter composes the topology. The technique has been extended to three-phase applications using a three-phase diode bridge and a single switch boost DC-DC converter operating in discontinuous conduction mode [A. R. Prasad, P. D. Ziogas, and S. Manias, "An Active Power Factor Correction Technique for Three-Phase Diode Rectifiers", IEEE Transactions on Power Electronics, Vol. 6, No. 1, pp. 83–92, 1991] The single active switch three-phase preregulator presents low cost and simplicity but the topology has as drawbacks high conduction losses, high switching stresses, and radio interference emission regulations resulting in a large input filter.

Circuits with multiple configuration and advanced designs are actually considered to increase the power levels and improve the generated waveforms [See A. Nabae, I. Takahashi and H. Akagi, "A New Neutral-Point-Clamped PWM Inverter", IEEE Transactions on Industry Applications, vol. IA-17, No. 5, pp. 518–523, 1981; and J. W. Kolar, H. Ertl and F. C. Zach, "Design and Experimental Investigation of a Three-Phase High Power Density High Efficiency Unity Power Factor PWM (VIENNA) Rectifier Employing a Novel Integrated Power Semiconductor Module", Conference records of APEC'96, pp. 514–523, 1996].

In fact, multilevel converters are starting to be used in industry and traction applications and its future seems promissory [See T. Katta, Y. Kurokawa, "Advanced Inverter Control System Using High Voltage IGBT for EMU" Conference records of IPEC'95, pp. 1060–1065, 1995 and S. Bernet, "Recent Developments of High Power Converters for Industry and Traction Applications" Conference records of COBEP'99, pp. 3–16, 1999].

The multilevel converters present some advantages over conventional two level converters such as:

The voltage imposed across the switching devices is reduced proportionally with the number of levels. In this way, it is possible to use them in high voltage systems increasing the converter capability [R. Rojas, T. Ohnishi, T. Suzuki, "PWM Control Method for a Four-Level Inverter", IEE Proceedings on Electric Power Applications, vol. 142, Issue 6, pp. 390–396, 1995].

Improve significantly the voltage and current waveforms, which results in a substantial reduction of the harmonic distortion [N. S. Choi, J. G. Cho and G. H. Cho, "A General Circuit Topology of Multilevel Inverter", Conference records of PESC'91, pp. 96–103, 1991 and J. Lai and F. Peng, "Multilevel Converters—A New Breed of Power Converters", IEEE Transactions on Industry Applications, vol. IA-32, No. 3, pp. 509–517, 1996]. This is probably the best characteristic of the multilevel converters because the actual tendency is to improve the waveforms of the power electronic circuits.

The electromagnetic interference is smaller than that of conventional converters because the voltage variation (dv/dt) at the commutation instant is divided by the number of levels [T. A. Meynard and H. Foch, "Multi-Level Conversion: High Voltage Choppers and Voltage-Source Inverters", Conference records of PESC'92, pp. 397–407, 1992]. In the European countries there is already a strict norm to limit the electromagnetic interference and other counties will follow their example.

An interesting configuration for a three-phase three-level rectifier has been considered lately by several researchers [See Ewaldo L. M. Mehl and Ivo Barbi, "An Improved High Power Factor and Low Cost Three-Phase Rectifier", Conference records of APEC'95, pp. 835–841, 1995; and J. W. Kolar, H. Ertl and F. C. Zach, "Design and Experimental Investigation of a Three-Phase High Power Density High Efficiency Unity Power Factor PWM (VIENNA) Rectifier Employing a Novel Integrated Power Semiconductor Module", Conference records of APEC'96, pp. 514–523, 1996]. The converter is composed by a combination of diodes and switches adjusted to the requirements of generating an input current nearly sinusoidal with high power factor and low total harmonic distortion while achieving the requirements of high efficiency, high reliability and controllable output voltage.

So far several control schemes for the three-phase three-level boost type rectifier have been proposed. In the control method proposed in [Ewaldo L. M. Mehl and Ivo Barbi, et al., op. cit.], the active switches are gated at the line frequency. The bi-directional switches are gated on at zero crossing of the corresponding phase-voltage. The open loop control is simple and total harmonic distortion may reach acceptable levels at certain point of operation. However, does not allow output voltage control and the harmonic distortion may increase if the conduction angle of the switches is chosen to be different than 30 degrees. Therefore, the applications for this type of control are reduced.

Authors of [F. Daniel, R. Chaffai and K. Al Haddad, "Three-Phase Diode Rectifier with Low Harmonic Distortion to Feed Capacitive Loads", Conference records of APEC'96, pp. 932–938, 1996] made some improvements in that control, but the controllability of the output voltage is still a drawback.

The methods introduced in [Yifan Zhao, Yue Li, and Thomas A. Lipo, "Force Commutated Three Level Boost Type Rectifier", IEEE Transactions on Industry Applications, vol. IA-31, No. 1, pp. 155–161, 1995] and [J. W. Kolar and F. C. Zach, "A Novel Three-Phase Three-Switch Three-Level Unity Power Factor PWM Rectifier", Conference records of PCIM'94, pp. 125–138, 1994] are based in advanced space vector control and both make use of complex digital logic, implemented with digital signal processors.

Another similitude of both techniques is the use of hysteresis controllers. Those control methods feature low input current harmonics, balance of the center point of the output voltage and high controllability of the output voltage. The disadvantages of the mentioned methods are: complex and expensive DSP-based control, complicated design of the input EMC filter due to the varying switching frequency (inherent problem of hysteresis controllers) and the current control error may be twice the hysteresis width as stated in [J. W. Kolar and F. C. Zach, et al., op. cit.].

The technique proposed in [P. Prestifilippo, R. Scibilia, G. Baggione, G. Caramazza, "A Switched-Mode Three-Phase 200A/48V Rectifier with Input Unity Power Factor", Conference records of INTELEC'96, pp. 543–547, 1996] consider the three-phase rectifier as three single-phase units and the control is implemented using commercial single-phase modulators with three independent current loops. The control is simple, but the input current ripple is much higher than that of the vector controls discussed above. Moreover, since three independent current loops are used it is not possible to synchronize the command signals of the switching devices and this compromise the control performance. Similar technique was used in [R. Gules, A. S. Martins and I. Barbi, "A Switched-Mode Three-Phase Three-Level Telecommunications Rectifier", Conference records of INTELEC'99, paper 29-3, 1999] but no further improvements were presented.

Finally, an interesting control method was presented in [P. Ide, N. Froehleke, H. Grotstollen, "Investigation of low cost control schemes for a selected 3-level switched mode rectifier", Proceedings of INTELEC'97, pp. 413–418, 1990], the double ramp comparison control concept was used, synchronizing the main devices command signals and therefore simplifying the EMC filter, reducing also the input current ripple. However, the control system needs to generate a sinusoidal function in order to balance the output voltages. The generation of this function may complicate the control because its phase and frequency must be synchronized with the mains.

In this work a new control method for the three-phase three-level boost-type rectifier will be introduced with the objective of solving the drawbacks presented by the above mentioned techniques.

3—Objectives of the Invention

The present invention introduces a new control scheme for a three-phase three-level boost-type rectifier with reduced input current ripple and balanced output voltages. The principal objective of the proposed technique is to simplify the control circuit as much as possible without compromising the rectifier performance. In fact, besides simplicity, the control method features synchronized command signals to de switching devices, minimized input current ripple, full controllability of the output voltage, dynamic balance of the output center point, constant switching frequency, simplified design of EMC filters, good transient and steady state performance, and low cost.

The control system uses two triangular carriers namely Trg1 and Trg2. The carriers have the same amplitude but are 180 degrees phase-shifted; Trg1 is used during the positive halve cycle of the respective phase voltage and Trg2 for the negative one. An analog switch in each phase permits the interchange among the triangular carriers. The switching devices command signal is obtained comparing the respective reference with the carriers. Thus the switching frequency is constant. The output center point balance is achieved by adding the positive and negative output voltages and using the sum as an error signal to modify the current waveform reference. This simplifies the control circuit and allows an accurate regulation of the center point potential.

The control system retains all the advances of multilevel converters. When compared with conventional two level systems, the proposed converter is characterized by a lower blocking voltage of the switching devices, lower harmonic distortion on the line currents, lower EMI rejected noise, absence of shoot-through current and offer positive and negative output voltages.

Compared with the techniques developed in [Ewaldo L. M. Mehl and Ivo Barbi, at al., op. cit.], and [F. Daniel, et al., op. cit.], the proposed method increases greatly the controllability of the output voltages and reduces the low frequency distortion. Advantages with respect to vector-control schemes of [Yifan Zhao, et al., op. cit.], and [J. W. Kolar et al., op. cit.], are simplified and cheaper control, and constant switching frequency, which facilitate the EMC filter design. The new technique offer lower input current ripple than methods based in three independent controllers such as those of [P. Prestifilippo, et al., op. cit.], and [R. Gules, et al., op. cit.]. The simplicity of the control of neutral potential can be considered as improvement with respect to the method presented in [P. Ide, et al., op. cit.].

SUMMARY

II. 1. Three-Phase Three-Level Boost-Type Rectifier Circuit Description and Operation.

The three-phase three-level boost-type rectifier may have different configurations, FIG. 1 shows four of the most interesting ones, but the principle of operation is basically the same for all of them. Although the circuits of FIGS. 1(a) and (c) have three more switches ($S_4$, $S_5$, and $S_6$), they are activated with the same command of $S_1$, $S_2$ and $S_3$ respectively. Therefore, when $S_1$ is activated, the input terminal "u" is clamped with the DC-link neutral point "O" and $e_{uO}=0$. When the switch is open, the direction of the input current determines the $e_{uO}$ potential difference. The terminal "u" will be clamped with "P" if $i_u$ is positive ($e_{uO}=E_d$); and with "N" if $i_u$ is negative ($e_{uO}=-E_d$). The analysis is also valid for the other switching arms and applies to all four topologies. A common equivalent circuit can be drawn as shown in FIG. 2. According with the switching state of the power semiconductors, each input terminal has three possible states; therefore, the three-phase system has 3×3×3=27 possible states. The states are listed in Table 1 below, which also gives the respective voltages referred to the neutral point.

TABLE 1

Switching states and voltages with respect to the neutral point.

| Group | state | $e_{uo}$ | $e_{vo}$ | $e_{wo}$ |
|---|---|---|---|---|
| a | $\bar{a}_1$ (PNN) | $E_d$ | $-E_d$ | $-E_d$ |
|   | $\bar{a}_2$ (PPN) | $E_d$ | $E_d$ | $-E_d$ |
|   | $\bar{a}_3$ (NPN) | $-E_d$ | $E_d$ | $-E_d$ |
|   | $\bar{a}_4$ (NPP) | $-E_d$ | $E_d$ | $E_d$ |
|   | $\bar{a}_5$ (NNP) | $-E_d$ | $-E_d$ | $E_d$ |
|   | $\bar{a}_6$ (PNP) | $E_d$ | $-E_d$ | $E_d$ |
| b | $\bar{b}_1$ (PON) | $E_d$ | 0 | $-E_d$ |
|   | $\bar{b}_2$ (OPN) | 0 | $E_d$ | $-E_d$ |
|   | $\bar{b}_3$ (NPO) | $-E_d$ | $E_d$ | 0 |
|   | $\bar{b}_4$ (NOP) | $-E_d$ | 0 | $E_d$ |
|   | $\bar{b}_5$ (ONP) | 0 | $-E_d$ | $E_d$ |
|   | $\bar{b}_6$ (PNO) | $E_d$ | $-E_d$ | 0 |
| c | $\bar{c}_1$ (POO) | $E_d$ | 0 | 0 |
|   | $\bar{c}_2$ (PPO) | $E_d$ | $E_d$ | 0 |
|   | $\bar{c}_3$ (OPO) | 0 | $E_d$ | 0 |
|   | $\bar{c}_4$ (OPP) | 0 | $E_d$ | $E_d$ |
|   | $\bar{c}_5$ (OOP) | 0 | 0 | $E_d$ |
|   | $\bar{c}_6$ (POP) | $E_d$ | 0 | $E_d$ |
| d | $\bar{d}_1$ (ONN) | 0 | $-E_d$ | $-E_d$ |
|   | $\bar{d}_2$ (OON) | 0 | 0 | $-E_d$ |
|   | $\bar{d}_3$ (NON) | $-E_d$ | 0 | $-E_d$ |
|   | $\bar{d}_4$ (NOO) | $-E_d$ | 0 | 0 |
|   | $\bar{d}_5$ (NNO) | $-E_d$ | $-E_d$ | 0 |
|   | $\bar{d}_6$ (ONO) | 0 | $-E_d$ | 0 |
| z | $\bar{z}_1$ (PPP), | 0 | 0 | 0 |
|   | $\bar{z}_2$ (OOO) | 0 | 0 | 0 |
|   | $\bar{z}_3$ (NNN) | 0 | 0 | 0 |

It can be noted that the maximum voltage stress in the power switches is only half of the DC-link voltage ($E_d$); this allows the use of faster and cheaper devices. Another significant advance is that there is no possibility of shot-though current on the rectifier arms, which simplifies the gating of the switches.

The switching states can be considered as space vectors, which components are placed in three axes, namely $e_{uO}$, $e_{vO}$ and $e_{wO}$, separated 120 degrees from each other. The space vector representation is a useful tool to generate advanced PWM (Phase Width Modulation). It helps to visualize the amplitude and phase of the voltage vectors. The space vector representation of the switching states of the three-phase three-level boost-type rectifier is shown in FIG. 3.

The voltage vectors have been classified in five groups. The big size vectors are associated in group "a" they are characterized because the input terminals are clamped to the positive terminal "P" or the negative terminal "N", with no connection to the neutral point. The group "b" corresponds to the medium size vectors; their amplitude is reduced because one of the input terminals is clamped to the neutral point.

Groups "c" and "d" refer to the small vectors. The input terminals are clamped to "P" and "O" in the case of group "c" and therefore are called small positive group. In the small negative group ("d") the input terminals are clamped to "N" and "O". The last set corresponds to the zero vectors, group "z"; the three input terminals are clamped to the same output point "O", "N" or "P".

II. 2. Control Methods.

If the converter output voltage is considered constant, the rectifier can be treated as voltage source connected to the utility through the input inductors as shown in the equivalent circuit of FIG. 4. The following relations can be writing by inspection of FIG. 4:

$$e_{an} = L_u \cdot \frac{di_u}{dt} + e_{un} \quad (1)$$

$$e_{bn} = L_v \cdot \frac{di_v}{dt} + e_{vn} \quad (2)$$

$$e_{cn} = L_w \cdot \frac{di_w}{dt} + e_{wn} \quad (3)$$

Form (1)~(4) it is clear that it is possible to control the input current by taking action on the rectifier input terminal voltage. From fundamental circuit theory it can be determined that for the input current to be sinusoidal, the input terminal voltages $e_{un}$, $e_{vn}$ and $e_{wn}$ must be sinusoidal as well. Using the concept of instantaneous mean value, it is necessary to generate sinusoidal PWM waveforms at the rectifier input-terminals, in other words, those voltages should be controllable in order to control the amplitude and phase angle of the input current.

It is well known that vector control schemes allow the generation of high quality waveforms, then it is possible to use the vector analysis as a useful tool to find an improved waveform generation. Let us review more deeply the space vector plane of FIG. 3. For symmetry it is enough to consider only one 60 degrees interval. There is a restriction that limits the number of possible vectors at any instant. Consider for example that the instantaneous current in one leg is positive, then the related input terminal can be clamped to the positive terminal if the switch is off and to the neutral terminal if the switch is on, but can no be clamped to the negative terminal.

Table 2 below lists the available vectors in the first 60 degrees interval and the respective switching state. It has been considered that the input current is in phase with the respective source voltage.

TABLE 2

Available vectors for the first 60 degrees interval.

| Vector | $S_1$ | $S_2$ | $S_3$ |
|---|---|---|---|
| $\overline{a}_6$ (PNP) | off | off | off |
| $\overline{b}_6$ (PNO) | off | off | on |
| $\overline{c}_6$ (POP) | off | on | off |
| $\overline{c}_1$ (POO) | off | on | on |
| $\overline{b}_5$ (ONP) | on | off | off |
| $\overline{d}_6$ (ONO) | on | off | on |
| $\overline{c}_5$ (OOP) | on | on | off |
| $\overline{z}_2$ (OOO) | on | on | on |

FIG. 5 shows the space vector representation for the first 60 degrees interval. A sinusoidal three-phase voltage waveform is represented in the space plane as a circle; the radius of the circle is related to the voltage amplitude.

At any instant, the points of the circle should de generated by a combination of the available vectors. For a switching frequency high enough, the medium value in a period can be considered as a point in the space plane A single vector can only generate one point; combining two vectors and changing their dwell time, the straight line that link tem can be generated. Then, to generate any point inside a sector, at least three vectors are needed.

Advanced vector control schemes divides the space plane in triangular sectors and the sinusoidal PWM waveform is generated by switching among the three vectors that correspond to the apices of the triangle that contains the respective point of the circle at that instant. [R. Rojas, T. Ohnishi, T. Suzuki, "An Improved Voltage Vector Control Method for Neutral-Point-Clamped Inverters", IEEE Transactions on Power Electronics, vol. 10, No 6, pp. 666–672, 1995].

For area 1 in FIG. 5, the vectors used are $\vec{c}_5$ (OOP), $\vec{b}_6$ (ONP), $\vec{c}_6$ (POP) and $\vec{d}_6$ (ONO). Generally this is executed by using hysteresis controllers and complicated look-up tables. The major problem associated with hysteresis control is that the switching frequency varies throughout the AC supply cycle.

In order to fix the switching frequency, carriers should be used to modulate the pulse width. A method that uses saw-tooth carriers to obtaining the command signals is illustrated in FIG. 5. The current reference is compared with the respective high-frequency saw-tooth carrier. To simplify the analysis the three carriers are supposed to be synchronized. The $i_u^*$, $i_v^*$ and $i_w^*$ signals represent the output of the respective current controller (modulating signal); they are supposed to be constant during the switching period. As can be seen from the figure there are 4 switching states per period, corresponding to the vectors $\vec{z}$ (OOO), (ONO), (ONP) and (PNP). Certainly those vectors give a picture of a bigger triangle in the space vector representation plane which results in lower quality of the waveform generation.

To overcome the drawbacks of the former mentioned techniques a different approach is considered in this work. The modulating signals are fed together with two high-frequency triangular carriers to the pulse-with modulator. The two carriers are of the same amplitude but 180 degrees phase-shifted; the first is used during the positive half cycle of the utility sinusoidal voltage and the other during the negative one. The principle of this technique is illustrated in FIG. 7. The modulating signals $i_u^*$ and $i_w^*$ are compared with Trg1 because the corresponding source voltages are positive during this interval (0~60 degrees) and $i_v^*$ is compared with Trg2 because it is negative. It is clear from FIG. 3 that with the same switching frequency the new control method generates eight states per period due to an appropriate distribution of the command pulses. The vectors used are (PNP), (ONP), (POP) and (ONO) which match up with the vectors selected by advanced vector control methods. Consequently, the input current ripple will be smaller with the new proposed control and having the advantage of constant switching frequency. Moreover, the "apparent switching frequency" is twice as that of the former control method because there are eight states per period instead of four.

II. 3. Output Voltages' Balance.

The neutral point potential is not a rigid voltage source; it is generated by the series connection of the DC-link capacitors. Thus, it is not certain that the two output voltages will remain equal. On the contrary, the neutral point potential will increase or decrease according to the charging-discharging action of the capacitors.

However, the capacitor voltages should be maintained in balanced condition to guarantee the true three-level operation throughout the whole range of voltage control. If it is violated the output may contain undesirable harmonic; moreover, if the neutral point potential deviates of its balanced condition the voltage over the switching devices or the capacitors may increase over their ratings and it makes impossible to operate the converter any longer; irreparable damages may occur.

Different from hysteresis based control methods, the proposed modulation technique is well symmetrical; therefore, symmetrical charge of the capacitors can be expected. Load is usually symmetrical as well, but slight imperfections in the circuit may promote neutral point voltage drift. Therefore, explicit control over the neutral point voltage must be implemented together with input current control.

Neutral point potential deviations are related with the process of charge and discharge of the DC-link capacitors. The input current gives the capacitor charge through the power semiconductor devices. The five groups of vectors produce different charge currents in the capacitors.

The connection between utility and DC-link capacitors for the five groups of vectors is illustrated in FIG. 8. The vectors of group "a" does not present any connection with the neutral point ("O"), therefore, the charge current is the same for both capacitors. On the other hand, no charge current is given to the capacitors when using vectors of group "z".

Different capacitor charge takes place only for vectors of groups "b", "c", and "d"; this fact can be exploited to control the neutral point potential. From FIG. 8 it is clear that a vector of group "c" charges capacitor $C_1$ and a vector of group "d" charges capacitor $C_2$.

Since vectors of groups "c" and "d" generate the same rectifier input terminal voltage, interchanging between them do not alter the input current control. Therefore, the neutral point potential can be controlled by acting on the dwell time of vectors of groups "c" and "d".

The same principle may be used for other advanced modulation techniques; however they differ in the way of controlling the dwell times. A number of methods to carry out the control has been considered, one of them using an additional hysteresis controller together with look-up tables, another method uses a cosine curve with a frequency three times the main frequency (utility).

The invention described here proposes to add a quantity proportional to the deviation to the input current reference waveform. In such a way a DC value will be added or subtracted to the modulating signal for the positive or negative halve cycle of mains voltage respectively.

After comparison with the triangular carrier, this will reflect in an increase of the "c" group vector dwell time and a decrease of the "d" group vector dwell time without altering the dwell time of other vectors. This fact is illustrated in FIG. 9; in FIG. 9(a) a small DC quantity was added to the reference signals and in FIG. 9(b) the same value was subtracted. Notice that the dwell time of vectors $\vec{c}_5$ (OOP) and $\vec{b}_5$ (ONP) remain inalterable whereas the dwell time of (POP) reduces in FIG. 9(a) and increases in FIG. 9(b). The opposite situation occurs with (ONO), which increases in FIG. 9(a) and reduces in FIG. 9(b).

II. 4. Control System.

The block diagram of the control system is given in FIG. 10. Analogue control signals are derived from the utility voltage, input current and from the output voltages. These signals are conditioned and combined to form the modulating signals that are fed, together with two high-frequency triangular carriers, to the pulse-width modulators. The digital outputs of the modulators provide the drive signals for the converter power switches. More details of the control blocks will now be described.

Referring to FIG. 10, a signal representing the output capacitor voltages is derived from a potential divider (1) and subtracted in (2) to obtain the total output voltage. This signal is compared with a DC reference voltage and regulated with a compensator (3), which generate the amplitude of the current reference.

The waveform of the current reference is derived from the utility voltage, which is sensed from potential dividers (4). Since the mains neutral is not available, an analog circuitry (5) is used to obtain the phase-voltage waveforms. This circuitry also gives the logic signals to discriminate the positive half cycle from the negative one. The sum of the positive and negative output voltages given by (6) represents the deviation of the neutral potential form its balanced condition. This signal is added to the phase voltages to obtain the balance control as explained above.

After the summing block (7) the signals are rectified in (8) to generate the current waveform reference. The current references are obtained by multiplying in (9) their common amplitude by the respective waveform; this signal represents a sinusoidal current proportional to the voltage error.

The actual currents are derived using current transformers with Hall-effect sensor (10) and then rectified in (11). The modulating signals are derived from analog controllers (12) that compare the respective actual and reference current to generate a compensation signal. Analog signal-switches (13) are used to exchange the two triangular carriers; the analog switch commands are given by (5).

The modulating and carrier signals are fed to a pulse-width modulator (14), which generates the drive signal for the respective converter power switch.

DETAILED DESCRIPTION

The achievements of the proposed control method will now be described in greater detail. The items considered are: controllability of the output voltage, switching frequency variations, input terminals voltage waveform, input current ripple, neutral potential balance, control circuit simplicity and feasibility demonstrated by simulation and experimental results. It is important to remark that the proposed control method keeps the advantageous characteristics of the three-phase three-level boost-type rectifiers such as:

Low voltage stress on the switching devices. Since the blocking voltage is only half the total DC-link, it allows the use of power switches with better higher switching frequency capability, smaller voltage drop when conducting and cheaper price.

There is no possibility of shot-though current on the rectifier arm; and therefore the gating of the switches is simplified and the circuit becomes more robust in operation.

Generates two output voltages: positive and negative permitting the use of one or two loads in the output terminals. In isolated power supplies applications, as the case of telecommunication equipment, this allows the use of two DC-DC converters as the second stage.

IV. 1. Controllability of the Output Voltage

Figure 5:
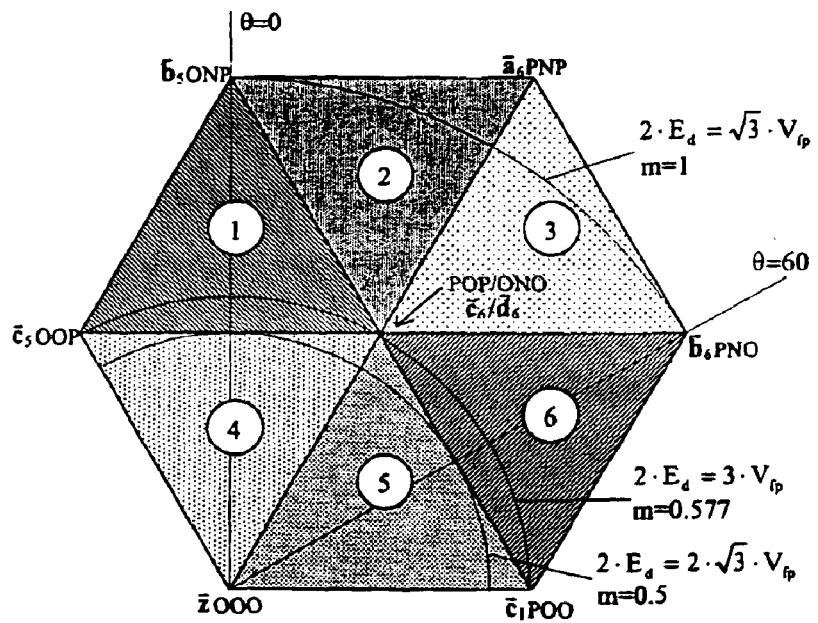
FIG. 5 shows the space vector representation of the first 60 degrees interval.
Figure 6:
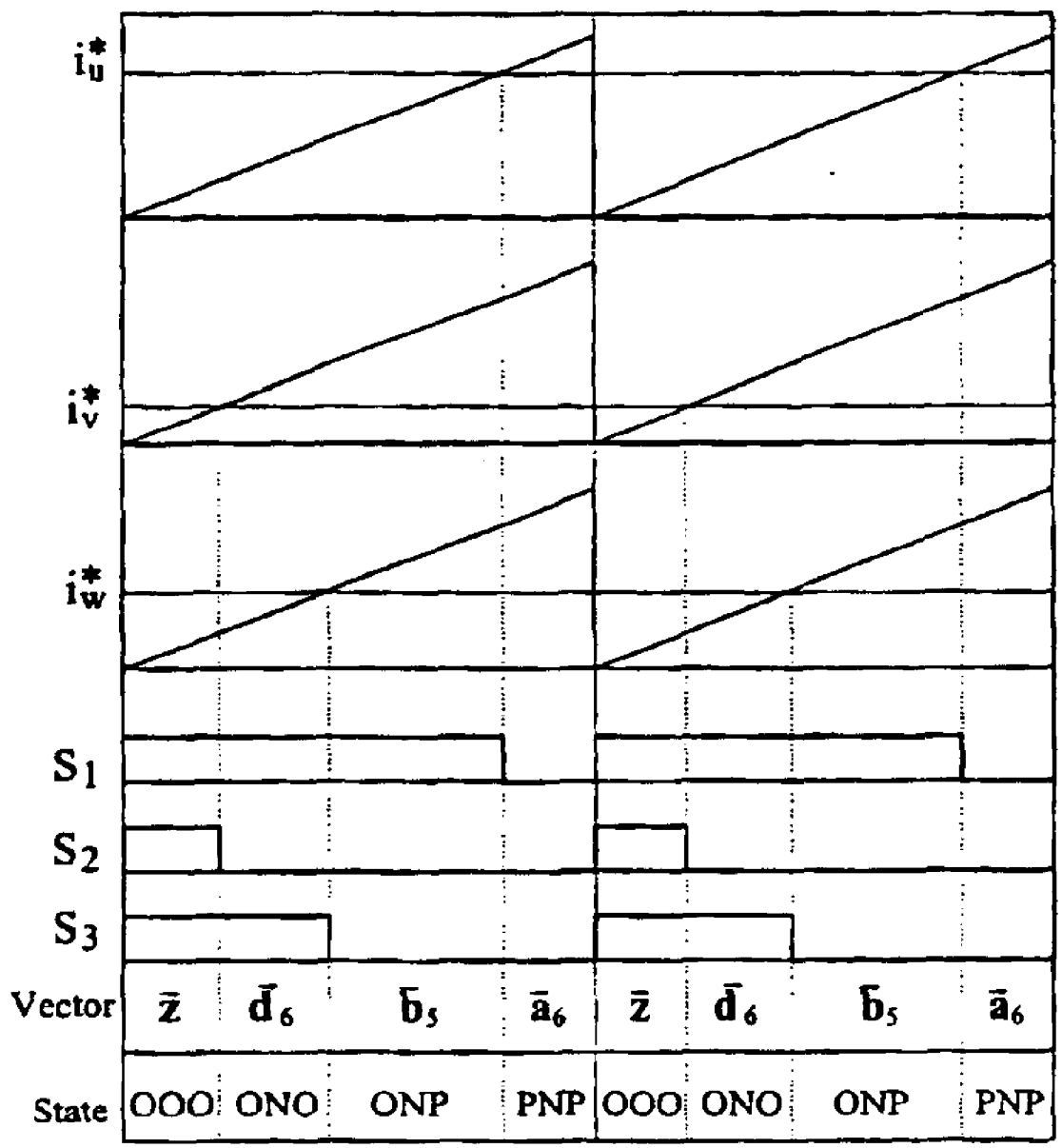
FIG. 6 shows the command signal generation for the single saw-tooth-carrier modulation-technique.
Figure 7:
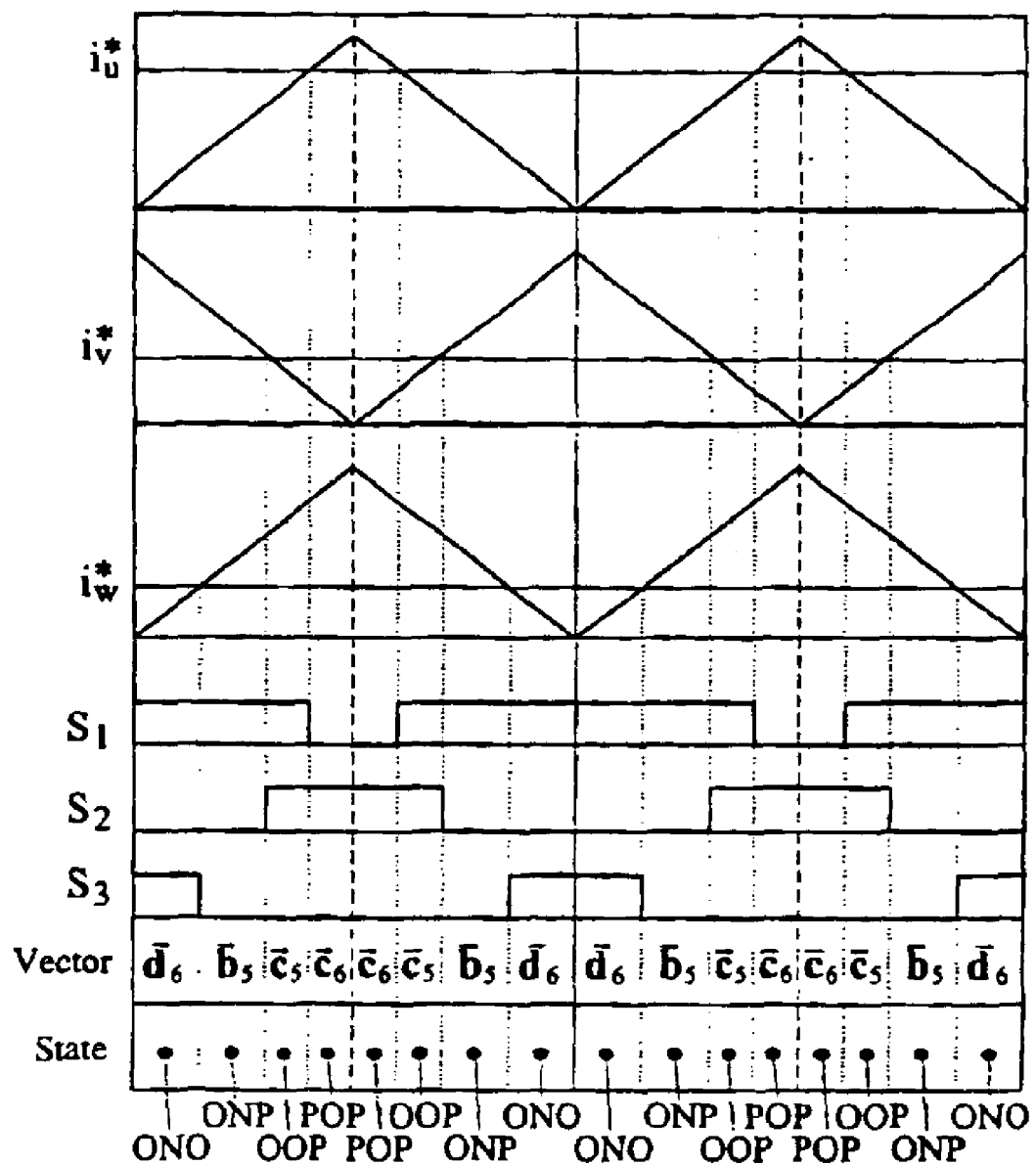
FIG. 7 shows the command signal generation for the proposed modulation method.
Figure 8A:
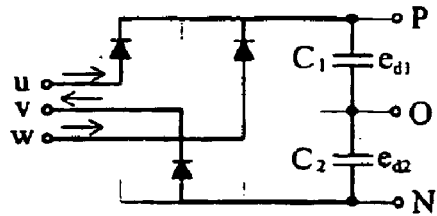
FIG. 8 shows the connection between utility supplier and DC-link capacitors for the five different vector groups.
Figure 8B:
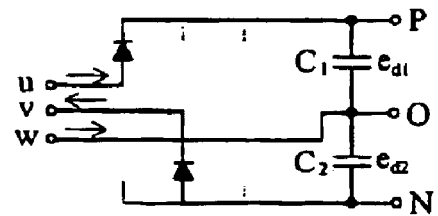
Figure 8C:
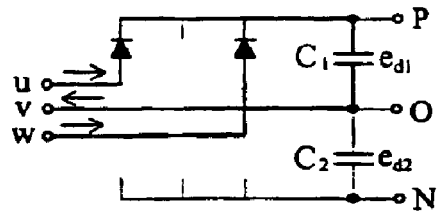
Figure 8D:
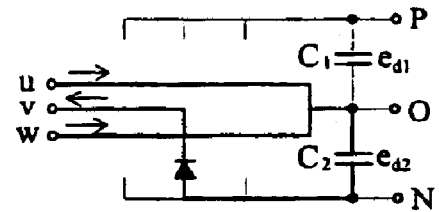
Figure 8E:
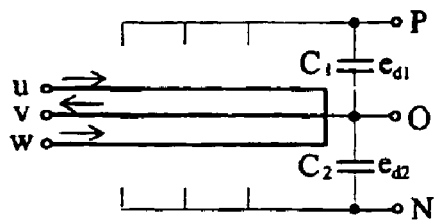
Figure 9A:
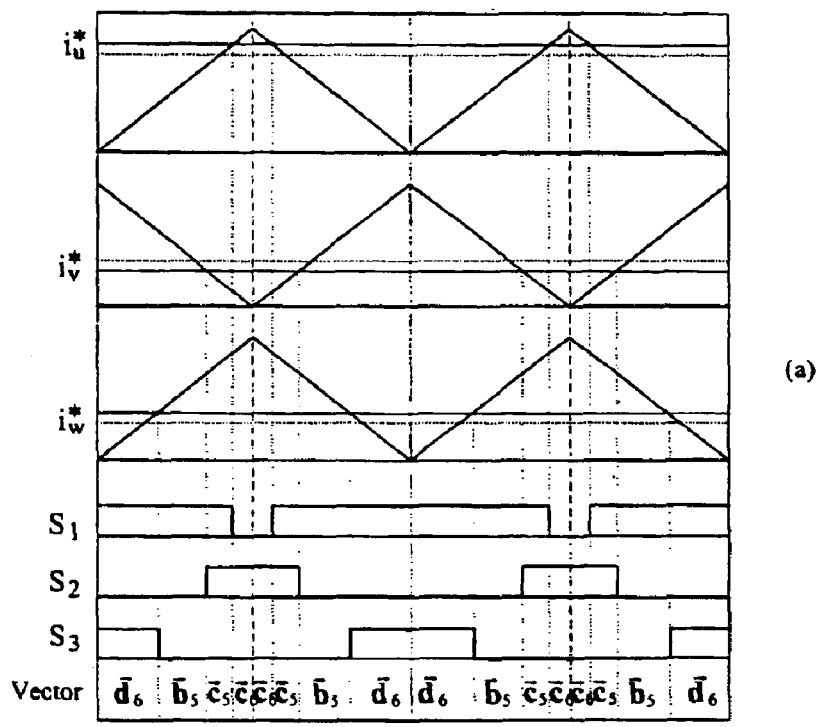
FIG. 9 shows the effect of adding a DC quantity to the waveform reference.
Figure 9B:
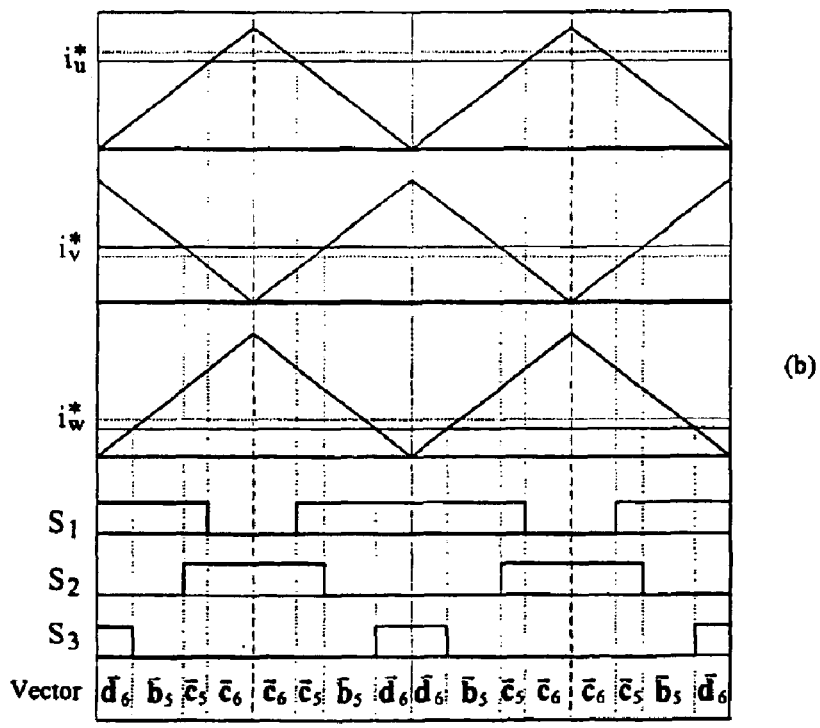

A simple analysis of the controllability of the output voltage can be done with the aid of FIG. 5 that shows the space vector representation of the converter switching states. At first, it is important to remember that balanced sinusoidal three-phase voltages are represented in the space plane as circles which radius is given by the amplitude of the sinusoidal waveform. Therefore, the figure gives a relation between the instantaneous average sinusoidal voltage at the rectifier input terminals and the output voltage.

On the other hand, remember that any point inside the area delimited by the straight lines that join the vectors can be generated by a linear combination of the three closed vectors. If the voltage drops in the boost inductors is small (which is normally the case), the instantaneous average voltage at the rectifier input terminals is near equal to the utility voltage. Then, it can be considered that FIG. 5 correlates the input and output voltages.

The utility voltage may be written in an equation form as:

$$e_{un} = V_{fp} \cdot \sin(\theta) \quad (4)$$
$$e_{vn} = V_{fp} \cdot \sin\left(\theta - \frac{2 \cdot \pi}{3}\right)$$
$$e_{wn} = V_{fp} \cdot \sin\left(\theta + \frac{2 \cdot \pi}{3}\right)$$

or $$e_{uv} = V_{Lp} \cdot \sin\left(\theta + \frac{\pi}{6}\right) \quad (5)$$
$$e_{vw} = V_{Lp} \cdot \sin\left(\theta - \frac{\pi}{2}\right)$$
$$e_{wu} = V_{Lp} \cdot \sin\left(\theta + \frac{5 \cdot \pi}{6}\right)$$

The modulation index ("m") is defined as the relation between the line-to-line peak voltage and the total DC-link voltage then:

$$m = \frac{V_{Lp}}{2 \cdot E_d} = \frac{\sqrt{3} \cdot V_{fp}}{2 \cdot E_d} \quad (6)$$

where:
m=modulation index
$V_{fp}$=Phase peak voltage
$V_{Lp}$=Line-to-line peak voltage
$E_d$=partial output voltage
$\theta = \omega t$ From FIG. 5 it can be seen it is possible to work with modulation indexes smaller than 1 and greater than zero. The minimum output voltage is obtained for a modulation index equal to 1; this case is represented as the circle with the greater radius where we have:

$$2 \cdot E_{d(max)} = V_{Lp} = \sqrt{3} \cdot V_{fp} \quad (7)$$

Theoretically the maximum output voltage is unlimited, but in practice it is limited by the minimum pulse-with allowed and principally by the voltage ratings of the converter elements.

In conclusion, the proposed control method of the present invention allows full control of the converter output voltage covering the maximum rage possible with the converter configuration. Moreover, over-modulation (m>1) is also possible provided that the input current distortion and the variation of the switching frequency that this condition may produce, are within acceptable levels.

IV. 2. Switching Frequency Variations

The power switches forming the converter must operate to generate the required waveforms and two commonly used methods of modulation are hysteresis control and fixed-frequency pulse-width modulation (PWM).

With hysteresis control, limit bands are set on either side of a signal representing the desired waveform. The converter switches are operated as to maintain the generated signal within the limits. The dead-band, between the limits, may be proportional to required signal, constant width or have both fixed and proportional components. More complex dead-band control is also possible. A proportional dead-band implies zero bandwidth at zero output demand, leading to practical problems in control implementation. A constant-width dead-band results in a higher percentage level of switching-frequency ripple current at low levels. For these reasons, the use of a dead-band having both constant and proportional components is often preferred.

A major problem associated with hysteresis control is that the switching frequency varies throughout the AC supply cycle. The crossing time of the signal with the limit bands are functions of the output voltage, the instantaneous AC supply voltage and the magnitude of the current demanded. The switching frequency is, therefore, variable.

Variable frequency operation makes compliance with EMC regulations more difficult since the frequency of the dominant ripple current is no longer known. With a fixed-frequency PWM converter system, the design of a passive EMI filter to reduce switching frequency components to acceptable levels is more simple since switching frequency is known. The proposed control uses two triangular carriers of the same amplitude and frequency but phase-shifted 180 degrees. This fixes the switching frequency of the power devices simplifying the EMI filter design.

On the other hand, with practical power switching devices and controllers there are minimum acceptable times for switch conduction (pulse-width). If these times are ignored, switching losses may become excessive as a result of switch operation in the linear region. Device temperatures may easily rise to levels at which failures occur. Besides if the modulating signal goes over the peak of the triangular carrier, switching pulses are lost altering the fixed switching frequency desired operation.

Figure 10:
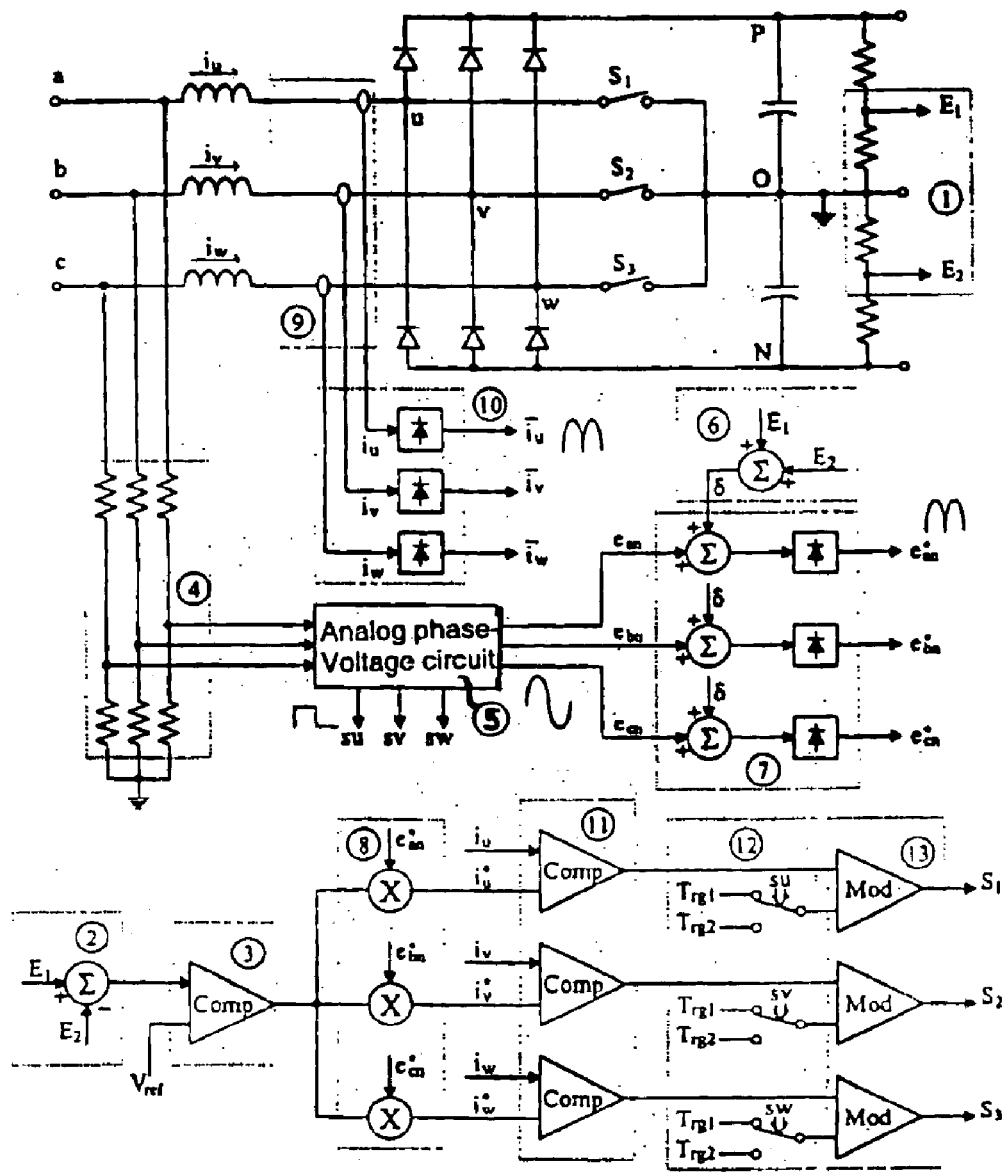
FIG. 10 shows the block diagram of the entire control system.
Figure 11:
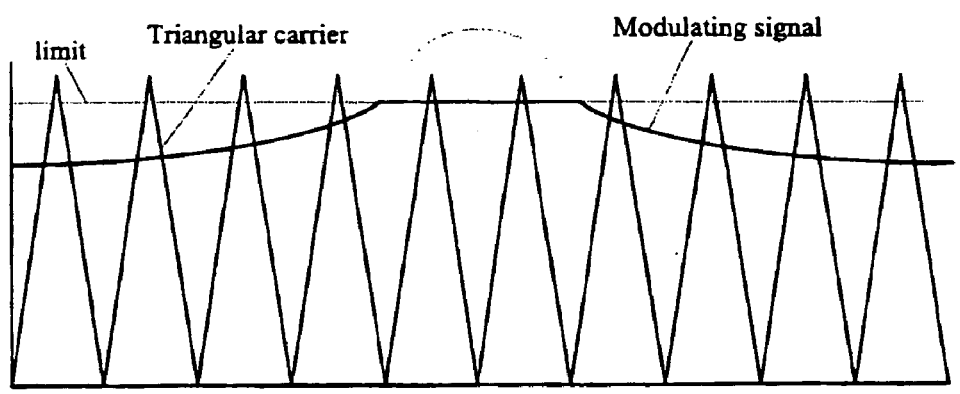
FIG. 11 illustrates the minimum pulse width limitation.

To prevent operation in this condition, a minimum pulse width set has been considered. The minimum pulse width limitation is achieved by limiting the amplitude of the modulating signal delivered by the current compensator shown in FIG. 10 as block (11). The operation of this limit is illustrated in FIG. 11. The modulated signal amplitude is constrained so that it never exceeds the limit value; the PWM duty cycle can vary only up to this level. This approach gives to advantages, it sets the minimum pulse width to a predetermined value and effectively fixes the switching frequency to the magnitude given by the triangular carrier.

IV. 3. Input Terminals Voltage Waveform

Figure 4:
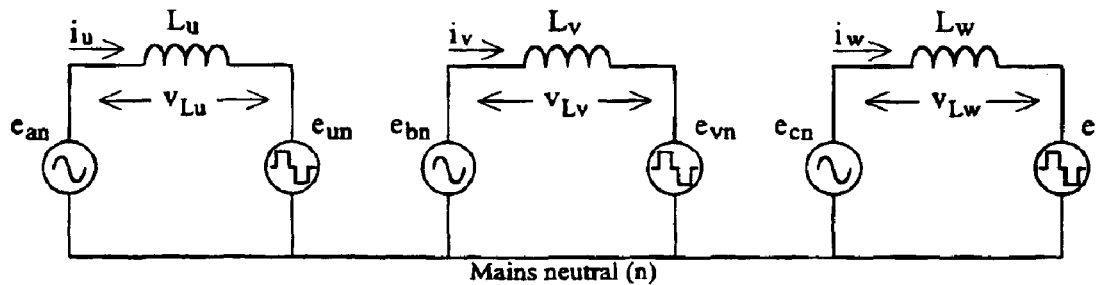
FIG. 4 shows an equivalent circuit of the converter.

As illustrated in FIG. 4, the rectifier can be treated as a voltage source connected to the utility supplier through the boost inductors. For the input current to be sinusoidal, the rectifier input terminal voltage should be sinusoidal as well. Then, the closest to sinusoidal is the PWM voltage waveform, the better input current waveform will be drawn from the AC source. Therefore, the input terminal voltage waveform is a very important parameter to take care for.

There are two parameters to analyze with respect to the sinusoidal PWM waveform: the harmonic contents and the maximum step change. The proposed modulation takes advantage in both parameters.

The maximum step change in the input terminal voltage can be determined from the instantaneous voltages generated by the rectifier switching states (vectors). Those voltages are listed in Table 3 below for one of the possible sequences. By inspection of Table 3 it is possible to determine that the maximum step from one state to the following is equal to $E_d$; that is half of the total DC-link voltage.

TABLE 3

Instantaneous line-to-line voltages generated by the proposed technique.

| Vector | $\bar{d}_6$ | $\bar{b}_5$ | $\bar{c}_5$ | $\bar{c}_6$ | $\bar{c}_6$ | $\bar{c}_5$ | $\bar{b}_5$ | $\bar{d}_6$ |
|---|---|---|---|---|---|---|---|---|
| State | (ONO) | (ONP) | (OOP) | (POP) | (POP) | (OOP) | (ONP) | (ONO) |
| $e_{uv}$ | $E_d$ | $E_d$ | 0 | $E_d$ | $E_d$ | 0 | $E_d$ | $E_d$ |
| $e_{vw}$ | $-E_d$ | $-2E_d$ | $-E_d$ | $-E_d$ | $-E_d$ | $-E_d$ | $-2E_d$ | $-E_d$ |
| $e_{wu}$ | 0 | $E_d$ | $E_d$ | 0 | 0 | $E_d$ | $E_d$ | 0 |

Table 4 below gives the instantaneous voltages of the vector sequence used by the single saw-tooth carrier technique, in which case the maximum step is equal to $2E_d$ that is twice the value obtained with the proposed method.

TABLE 4

Instantaneous line-to-line voltages generated by the single saw-tooth carrier technique.

| Vector | $\bar{z}_2$ | $\bar{d}_6$ | $\bar{b}_5$ | $\bar{a}_6$ | $\bar{z}_2$ | $\bar{d}_6$ | $\bar{b}_5$ | $\bar{a}_6$ |
|---|---|---|---|---|---|---|---|---|
| State | (OOO) | (ONO) | (ONP) | (PNP) | (OOO) | (ONO) | (ONP) | (PNP) |
| $e_{uv}$ | 0 | $E_d$ | $E_d$ | $2E_d$ | 0 | $E_d$ | $E_d$ | $2E_d$ |
| $e_{vw}$ | 0 | $-E_d$ | $-2E_d$ | $-2E_d$ | 0 | $-E_d$ | $-2E_d$ | $-2E_d$ |
| $e_{wu}$ | 0 | 0 | $E_d$ | 0 | 0 | 0 | $E_d$ | 0 |

Figure 12A:
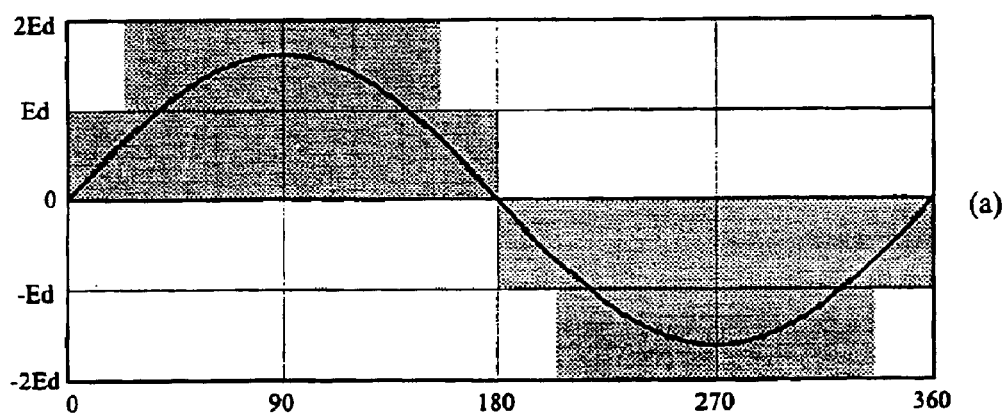
FIG. 12 shows the line-to-line voltage shape for (a) single saw-tooth technique, and (b) proposed modulation technique.
Figure 12B:
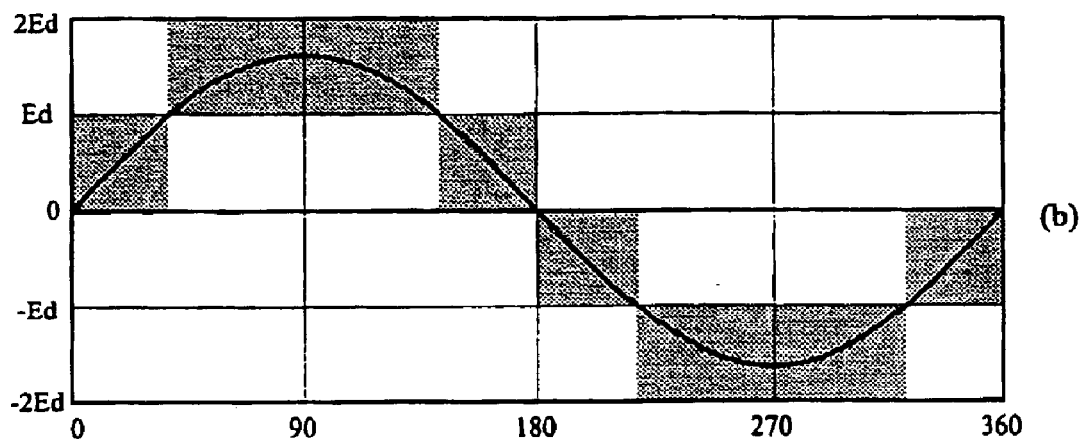

FIG. 12 shows the area where switching may occur for the single saw-tooth modulation and the proposed modulation. It is clear that the minimum step is obtained by the proposed modulation. Moreover, the PWM waveform is closer to a sinusoidal in the proposed technique.

Due to the smaller step change the harmonic contents of the waveform is smaller, but another advantage of the proposed technique is that due to the use of two triangular carries phase-shifted 180 degrees, a great amount of harmonic components are cancelled reducing further the harmonic contents of the waveform.

IV. 4. Input Current Ripple

The input current contains a high-frequency saw-tooth waveform ripple. The saw-tooth form depends upon the point in the AC supply cycle and the switching duty cycle at which the converter is momentarily operating. The form varies from fast rise and slow fall, thorough balanced triangular from to slow rise and sharp fall. The carrier ripple has components at the switching frequency and all of its harmonics, the amplitude of a component being inversely proportional to its order.

The high frequency current ripple may be defined as the difference between the maximum and minimum instantaneous value that the current takes in one switching period. Between the small time extent for commutation of two switching states the AC source and converter input terminals voltages could be considered constant. Therefore the voltage across the boost inductor will be also constant. Considering the equivalent circuit of FIG. 4, the variation of the current through the inductor can be calculated by $$\Delta i = \frac{V_L}{L} \cdot \Delta t \qquad (8)$$

then:

$$\Delta i_u = \frac{e_{an} - e_{un}}{L} \cdot \Delta t \qquad (9)$$

where $e_{an}$ is AC source phase-voltage, which is a known value, $e_{un}$ is the rectifier input terminal voltage refereed to the mains neutral, L is the boost inductor inductance and $\Delta T$ the time interval. The input terminal voltage $e_{un}$ is a function of the switching state and the output voltage; it can be derived from the voltages listed in Table 1 as:

$$e_{un} = e_{uO} - \frac{e_{uO} + e_{vO} + e_{wO}}{3} \qquad (10)$$

The time interval that a switching state is applied is given by the product of the dwell time of the respective vector times the period of the triangular carrier. The dwell time is calculated considering generation of sinusoidal PWM waveform at the rectifier input terminals.

After some mathematical calculations and simplifications the expression that defines the input current ripple can be written as:

$$\Delta i_{u(max)} = \frac{E_d \cdot i_u(\theta, m)}{6 \cdot f_s \cdot L} \qquad (11)$$

where:
$\Delta i_{u(max)}$=maximum value of input current ripple
$E_d$=partial output voltage
$f_s$=triangular carrier frequency
L=boost inductor inductance
$\theta=\omega t$=instantaneous phase-angle of AC voltage source
m=modulation index
$i_u(\theta, m)$=ripple factor given in the curves of FIG. 13

Figure 13:
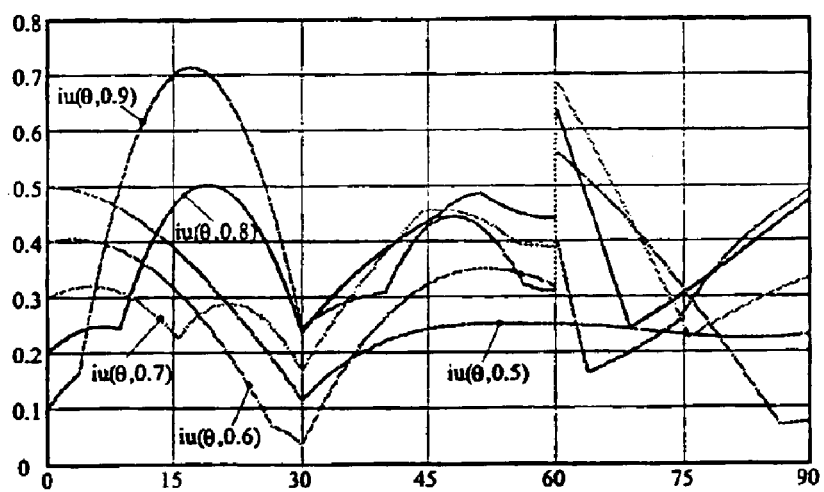
FIG. 13 shows the ripple factor for the proposed modulation technique.

As can be seen from FIG. 13 the maximum value of the ripple factor is about 0.7; then the relation for calculating the ripple current can be simplified as:

$$\Delta i_{u(max)} = \frac{E_d \cdot 0.7}{6 \cdot f_s \cdot L} \qquad (12)$$

For comparison purpose, the input current ripple obtained with the conventional single-phase boost-type rectifier has been calculated. The results are given in (13) and again the $i(\theta,m)$ represent the ripple factor which for the case of the single phase boost-type rectifier is given by the curves of FIG. 14.

$$\Delta i_{(single-phase)} = \frac{Vo}{fs \cdot L} \cdot i(\theta, m) \qquad (13)$$

Figure 14:
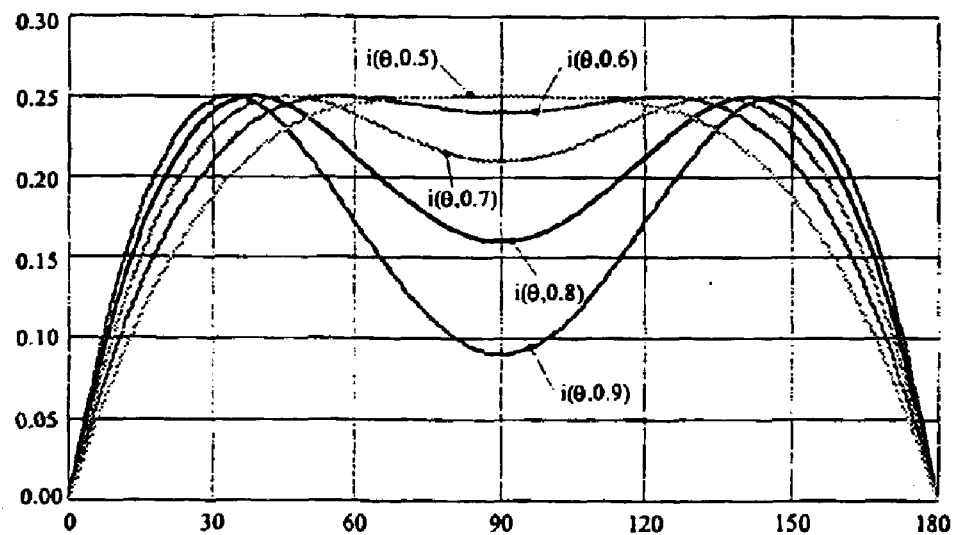
FIG. 14 shows the ripple factor for the conventional single-phase boost type rectifier.

FIG. 14 shows that the maximum value of $i(\theta,m)$ is 0.25, then the input current ripple for the conventional single-phase boost-type rectifier can be simplified as:

$$\Delta i_{(single-phase)} = \frac{0.25 \cdot Vo}{fs \cdot L} \qquad (14)$$

It should be remembered that the total output voltage in the three-level three-phase rectifier is equal to $Vo=2E_d$. Considering the same switching frequency and the same boost inductor value, from equations (12) and (14) we get:

$$\Delta i_{u(max)} = 0.23 \cdot \Delta i_{(single-phase)} \qquad (15)$$

Relation (15) demonstrates that the proposed modulation technique can effectively reduce, a great amount, the input current ripple. This is certainly one of the best characteristic of the proposed control method.

IV. 5. Neutral Potential Balance

Variation of the DC-link neutral point potential is an inherent problem in three-level converter configurations. It is required that the two DC capacitor voltages should be maintained in balanced conditions to avoid undesirable harmonics and reduce the ratings of the converter elements.

In the former sections this problem was considered and a method to control the neutral potential was introduced. Here we would like to reinforce the fact that the method proposed to balance the output voltages is simple and permits a wide range control without altering the waveforms of the generated voltage and current.

Considering a balanced load connected to the rectifier output, the variations on the neutral potential takes place only when vectors of groups "b", "c" and "d" are used. The method is basically characterized by controlling the dwell time of the small positive "c" and small negative "d" vectors to compensate the variations introduced by the medium size vectors and small imperfections that an actual design always has.

The control operation can be defined as the application of certain dwell time of the available vectors in each are in order to obtain sinusoidal PWM waveforms. The instantaneous average value of the PWM waveform will be the sum of the products of the voltage vector by the respective dwell-time. For example, in area 2 of FIG. 5 the control operation is:

$$\vec{v} = \begin{bmatrix} e_{un} \\ e_{vn} \\ e_{wn} \end{bmatrix} = \alpha_1 \cdot [\vec{d}_6] + \alpha_2 \cdot [\vec{b}_5] + \alpha_{3c} \cdot [\vec{c}_6] + \alpha_{3d} \cdot [\vec{d}_6] = \begin{bmatrix} V_{fp} \cdot \sin(\theta) \\ V_{fp} \cdot \sin(\theta - 2 \cdot \pi/3) \\ V_{fp} \cdot \sin(\theta + 2 \cdot \pi/3) \end{bmatrix} \qquad (16)$$

where $\alpha$ represents the dwell time of the respective vector

As we know the load connections for each switching state (FIG. 8) the current through the neutral terminal ("O") is also known. For area 2 this current results in:

$$i_O = \alpha_2 \cdot i_u + \alpha_{3c} \cdot i_v - \alpha_{3d} \cdot i_v \qquad (17)$$

To maintain the DC-link capacitors balanced, the instantaneous main value of the neutral current should the zero. As mentioned before, the small positive and small negative vectors generate the same input terminal voltage then it is possible to vary their dwell time without altering the generated waveforms; however the sum of $\alpha_{3c}+\alpha_{3d}$ should remain equal to $\alpha_3$ which is the value required for the sinusoidal PWM. Then, in area 2 it is possible to control the neutral current only within the range given by:

$$-|\alpha_3 \cdot i_v| \leq |\alpha_2 \cdot i_u| \leq |\alpha_3 \cdot i_v| \qquad (18)$$

Figure 15:
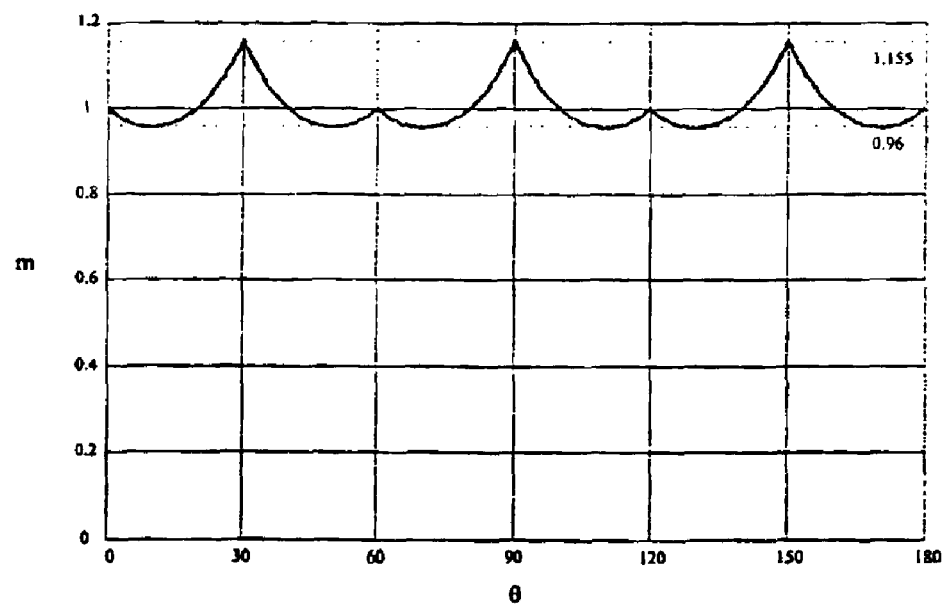
FIG. 15 shows the maximum modulation index to fully control the neutral point potential.

Another restriction is inherent to the dwell time concept; it must be a positive quantity, it is physically impossible to generate negative dwell-time. Taking into account those restrictions we can find out the neutral potential controllable region. FIG. 15 shows the controllable region of the neutral point potential. Notice that for balanced loads the neutral potential is full controllable in 96% of the operational range. In the reminder 4% instantaneous deviations may occur, but their average value over a longer period is null (one cycle of the AC source voltage). Then a small ripple with a frequency three times the source voltage frequency may appear, but for practical system this ripple is insignificant.

To put it briefly, the proposed control technique allows an effective control of the neutral potential over almost the whole extent of output voltage control, and with a simpler circuit it obtains the maximum possible controllable range of the neutral point potential that the topology permit.

IV. 6. Control Circuit Simplicity

The simplicity of the control circuit is one of the most important accomplishments of the proposed method. The use of DSP (Digital Signal Processor) is relatively frequent in advanced control designs, it may increase the versatility of the converter. However, besides it higher cost and complexity, it may require longer time to reach steady state of operation and may have switching frequency limitations. Moreover, the faster response of the analogue controller may offer and advantageous control in transient operation.

The proposed control circuit may be designed basically with cheap and well proved operational amplifiers. Hall effect current sensors are recommended to sample the input current and provide linearity and isolation. Those are probably the most expensive elements of the control circuit. Besides them, the straightforward concept of the proposed method allows to make simpler the control system design as illustrated in the block diagram of FIG. 10.

IV. 7. Simulation and Experimental Results

Figure 1A:
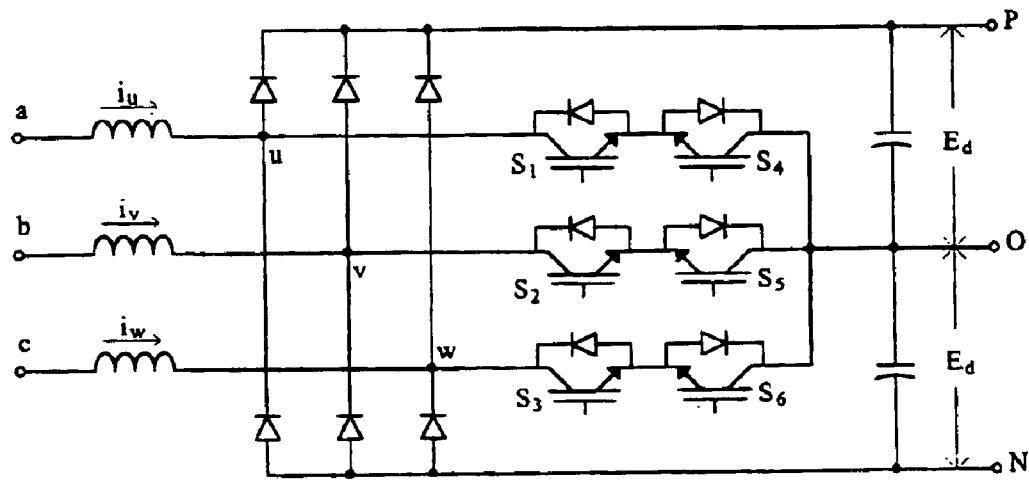
FIG. 1 shows some of the most important configurations of the three-phase three-level boost-type rectifier.
Figure 1B:
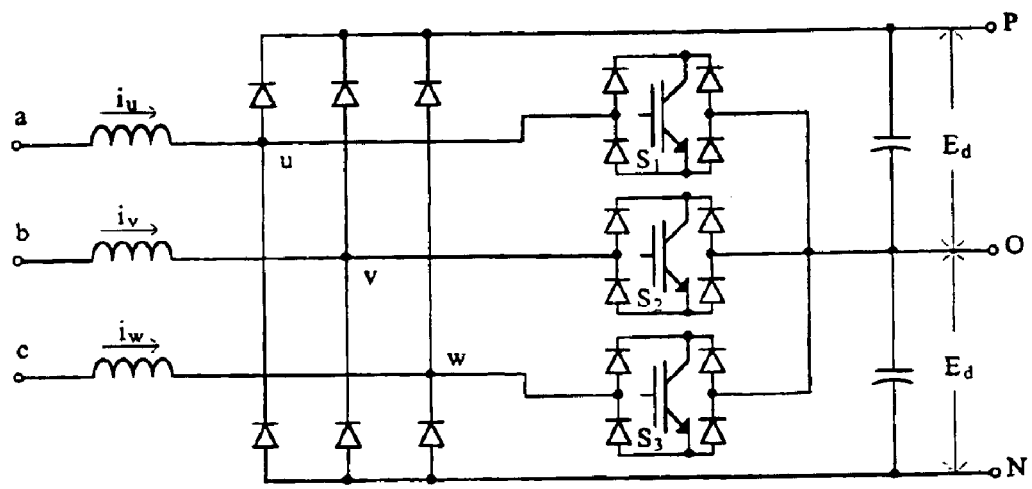
Figure 1C:
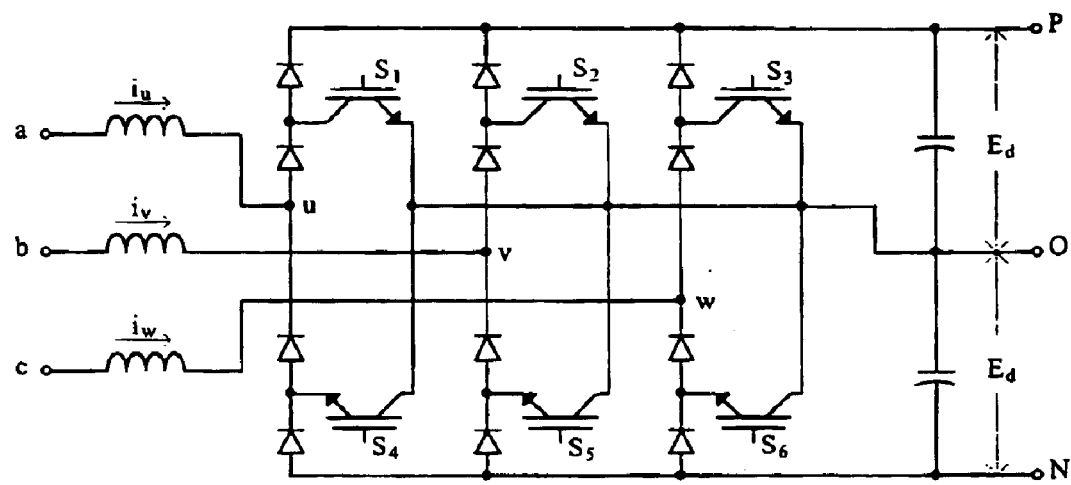
Figure 1D:
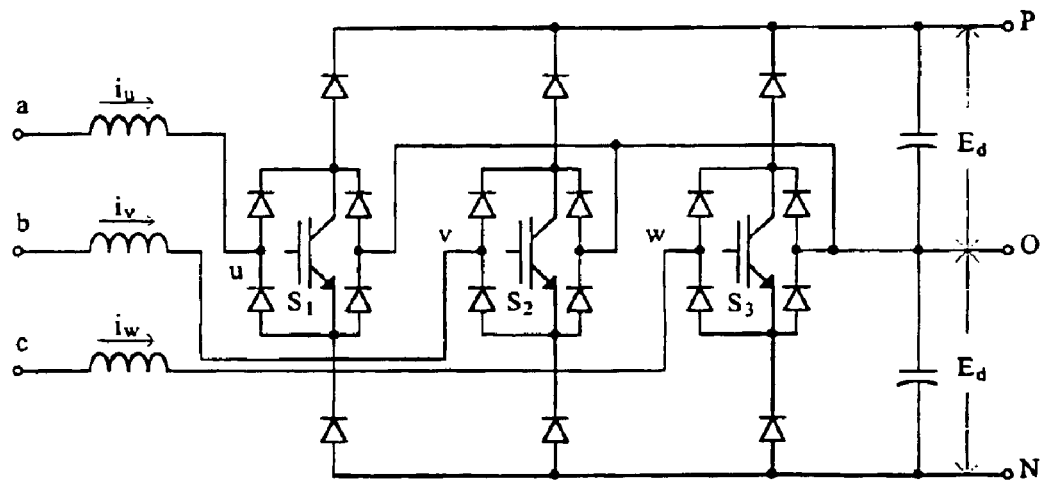
Figure 2:
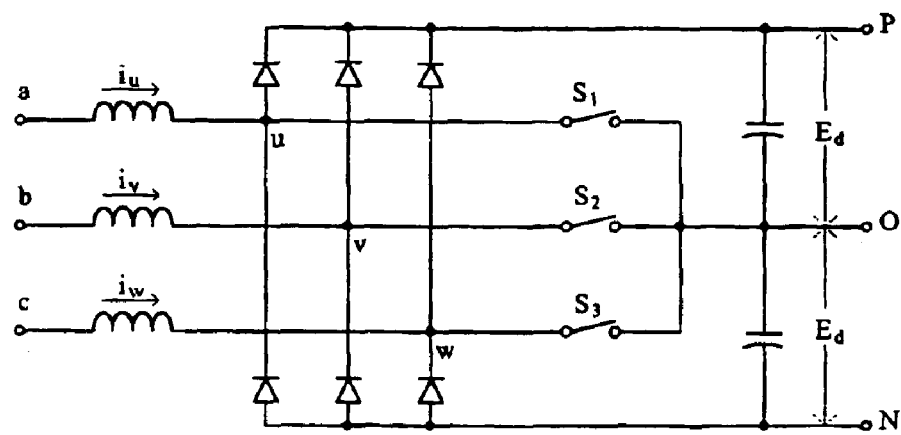
FIG. 2 shows an equivalent circuit of the three-phase three-level boost-type rectifier.
Figure 3:
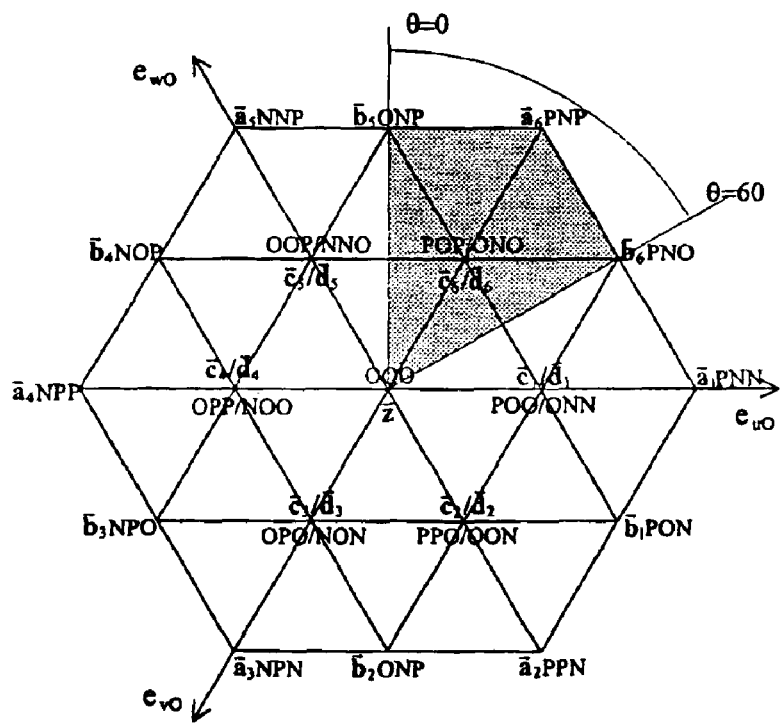
FIG. 3 shows the planar space vector representation of the rectifier switching states.

Simulations and experiment were performed to verify the feasibility of the proposed control method. The simulations were carried out with the aid of the simulator package SABER. The circuit of FIG. 1(a) was simulated under the following parameters:

| | |
|---|---|
| Output power: | $P_o$ = 12 kW |
| Line-to-line AC source voltage: | $e_{ab}$ = 380 V |
| AC source frequency: | f = 60 Hz |
| Partial output voltage: | $E_d$ = 400 V |
| Boost inductor: | $L_u = L_v = L_w$ = 270 $\mu$H |

-continued

| | |
|---|---|
| Switching frequency: | $f_s$ = 70 kHz |
| DC-link capacitors: | $C_1 = C_2$ = 2800 µF |
| Resistive load: | $R_{L1} = R_{L2}$ = 26.67Ω |

Figure 16:
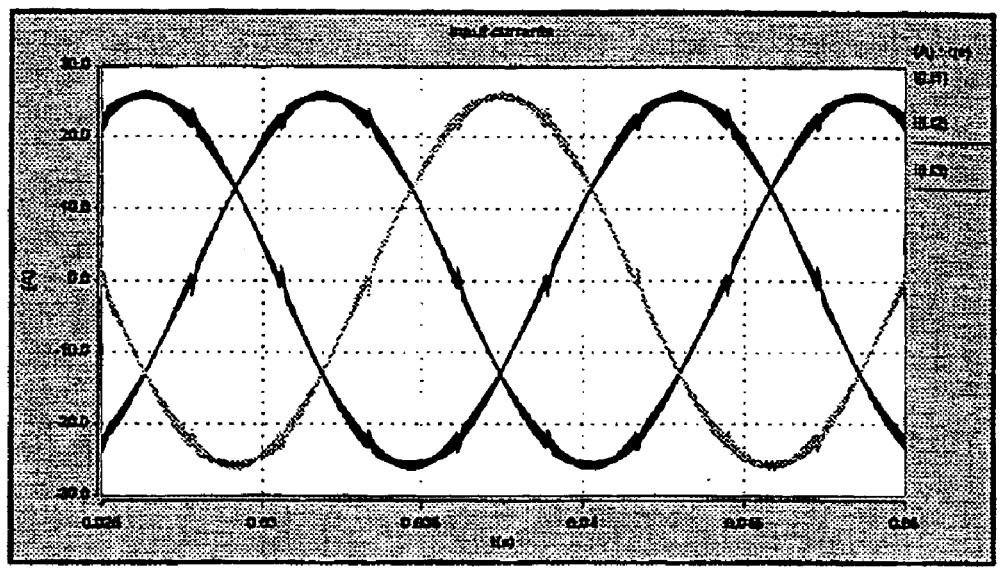
FIG. 16 shows the simulated waveforms of the input currents.

FIG. 16 shows the current through the three input lines. From the figure we can be clearly appreciate the high quality of the current which, in spite of the small boost inductance used, presents a sinusoidal waveform with very small ripple. Moreover, the three currents are well balanced.

Figure 17:
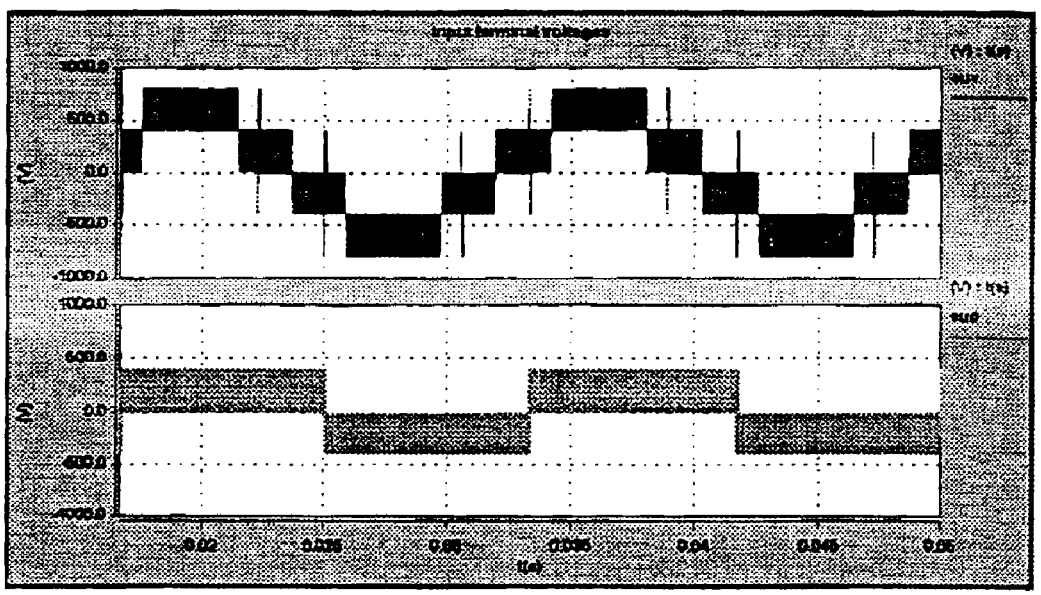
FIG. 17 shows the simulated waveforms of the input terminal voltages $e_{uv}$ and $e_{uO}$.

FIG. 17 shows the waveforms of the input terminal voltages. The upper wave represents the potential difference between terminal "u" and terminal "v" (see FIG. 1(a)) and the lower represents the voltage between terminal "u" and the DC-link voltage neutral point "O". Both waveforms confirm the analysis performed in the former sections. The $e_{uO}$ waveform presents three switching levels +400V, 0V and −400V; whereas the line-to-line $e_{uv}$ waveform exhibits five levels: +800V, +400V, 0V, −400V, −800V.

Figure 18:
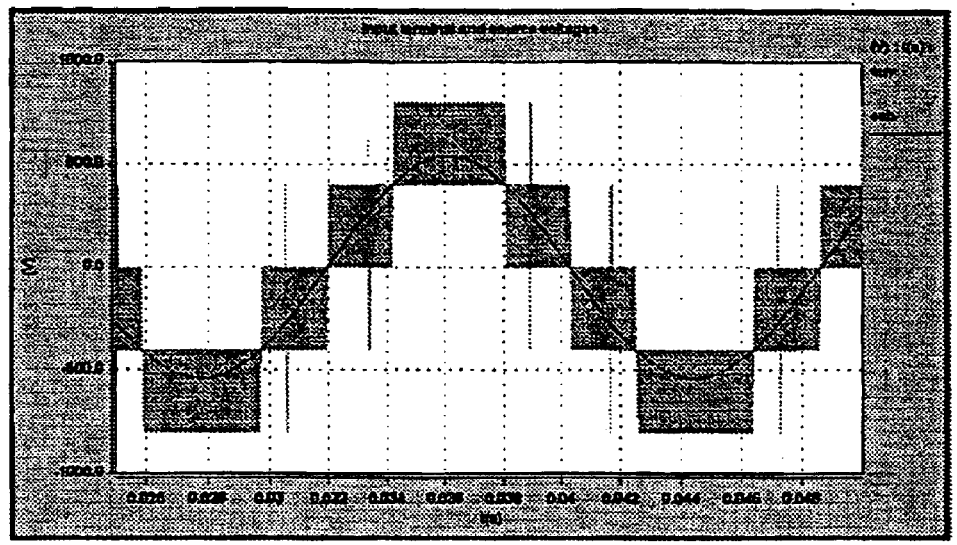
FIG. 18 shows the simulation results of the input terminal voltage $e_{uv}$ and source voltage $e_{ab}$.

FIG. 18 shows the input terminal $e_{uv}$ and AC source voltage $e_{ab}$ waveforms. As predicted in the theoretical analysis, the switching levels in the $e_{uv}$ voltage change in optimal angles so that it allows the generation of the sinusoidal PWM waveform by switching among the two closer levels and minimize the voltage step (equal to 400V in this case).

Figure 19:
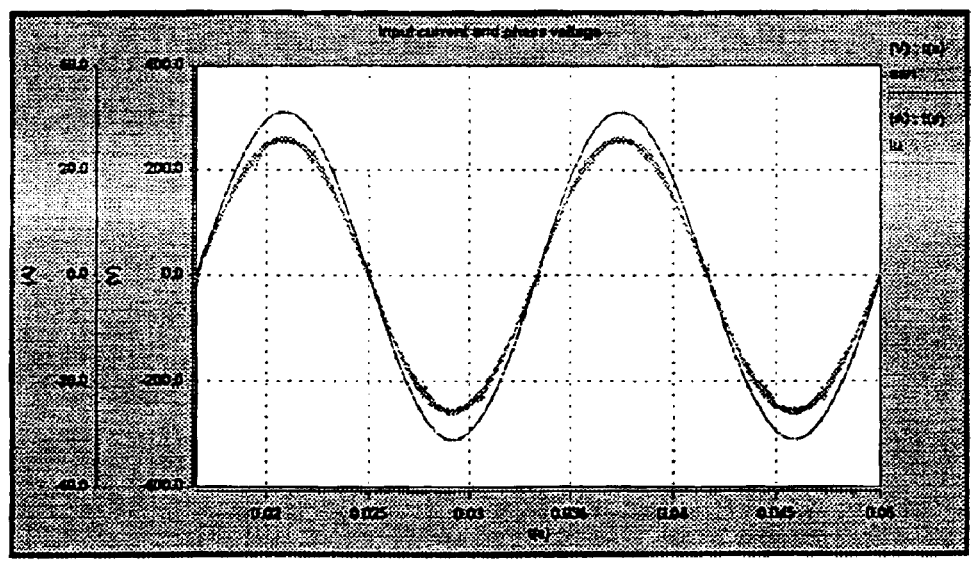
FIG. 19 shows the simulation results of phase voltage and input current.

FIG. 19 shows the AC source phase voltage an its respective input current. The Figure demonstrates that the current is practically sinusoidal with low THD (total harmonic distortion) and high power factor.

To verify the validity of the proposed control method experimentally, an actual prototype was constructed and tested in the laboratory. Insulated Gate Bipolar Transistors (IGBT) were used as the switching devices of the three-phase three-level boost-type rectifier. The configuration used was that shown in FIG. 1(a). The parameters for the experiment were:

| | |
|---|---|
| Maximum output power: | $P_o$ = 12 kW |
| Line-to-line AC source voltage: | $e_{ab}$ = 220 V and |
| AC source frequency: | f = 60 Hz |
| Partial output voltage: | $E_d$ = 400 V |
| Boost inductor: | $L_u = L_v = L_w$ = 270 µH |
| Switching frequency: | $f_s$ = 60 kHz |
| DC-link capacitors: | $C_1 = C_2$ = 2800 µF |

Figure 20:
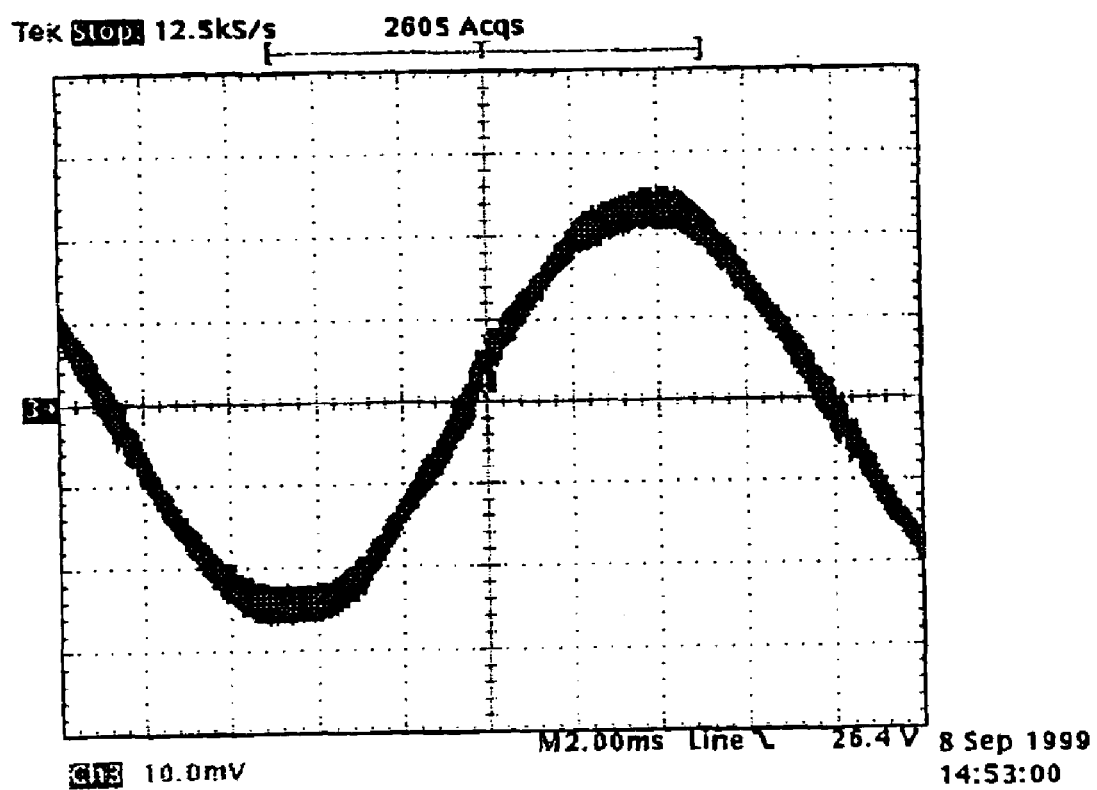
FIG. 20 shows the waveforms experimentally obtained of the Input current for $e_{ab}$=220V and $P_o$=6.5 kW.

FIG. 20 shows the input current for a line-to-line AC source voltage of 220V and $P_o$=6.5 kW. Clearly, the current presents a good quality sinusoidal waveform. The total harmonic distortion measured was of 2.5%.

Figure 21:
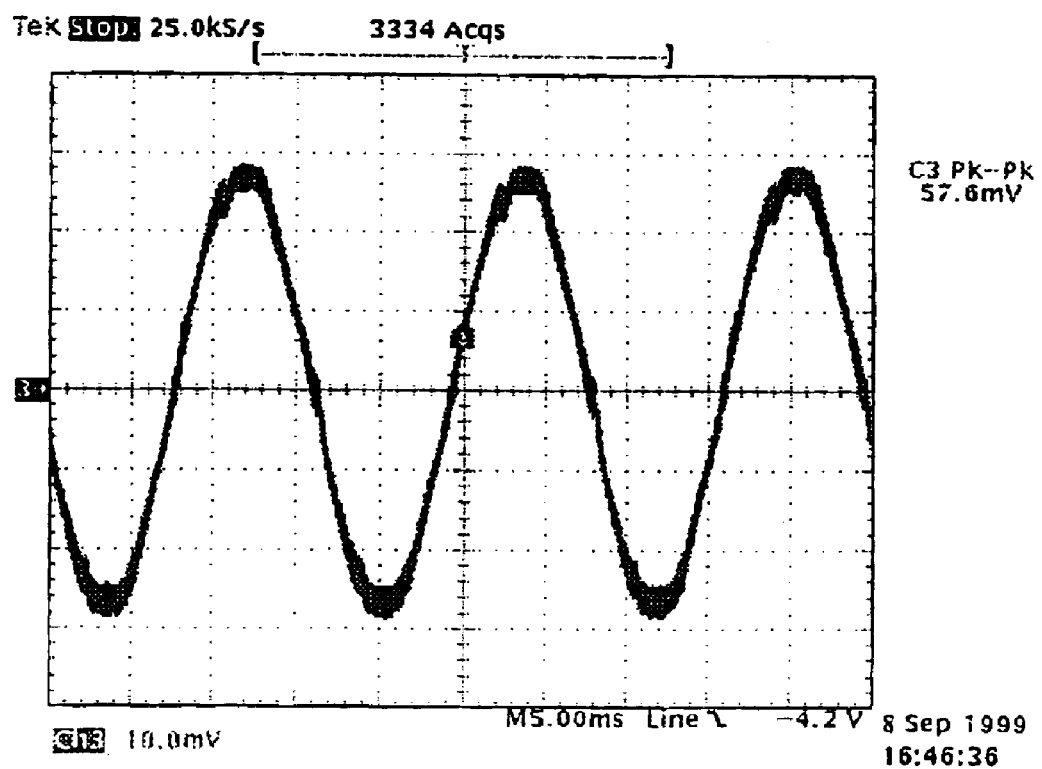
FIG. 21 shows the experimental results of the input current waveforms for $e_{ab}$=380V and $P_o$=12.5 kW.

FIG. 21 shows the input current for $e_{ab}$=380V and $P_o$=12.5 kW. Same as in the former figure, the current presents a nearly sinusoidal waveform. In this case the measured THD was of 3.8%.

Figure 22:
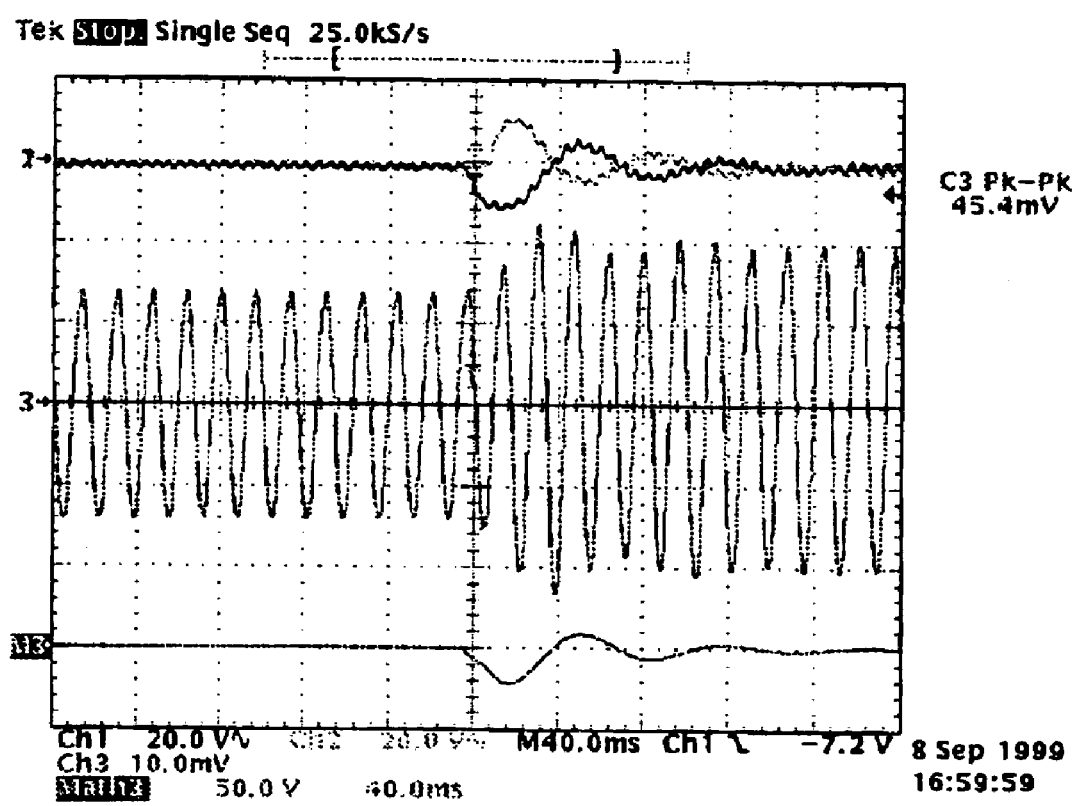
FIG. 22 refers to the experimental results of load transient from 6.6 kW to 9.5 kW.

FIG. 22 shows the transient response for a step change in the load. The output power step was from 6.65 kW to 9.5 kW whereas the input AC source voltage was kept at 380V. In the figure are shown from top to bottom the two partial output voltages (only the AC component), the input current and the total DC link voltage (again, only the AC component). As can be seen, in steady state (before the load transient), the output voltages remain balanced with very small ripple. At the instant of load change there is a deviation of the balance condition but it is smaller than 3% and quickly return to the steady state condition, it is balanced output voltages. The current presents a sinusoidal waveform before, during, and after the transient.

Simulations and experiment confirmed the theoretical analysis and verified the feasibility of the proposed control method.

What is claimed is:

1. Synchronized control method for controlling the total output voltage, generate sinusoidal input currents and balance the two partial output voltages in a three-phase three-level boost-type rectifier, characterized by using first and second triangular carriers with the same amplitude and 180 degrees phase-shifted for the Pulse Width Modulation (PWM), the first triangular carrier being used during the positive half cycle and the second triangular carrier for the negative half cycle of the respective phase voltage, while acting over the input current waveform reference to balance the output voltages.

2. Synchronized control method for a three-phase three-level boost-type rectifier, according to claim 1, characterized besides by the fact that the switching pulses are synchronized and appropriately distributed allowing a reduction in the input current ripple.

3. Synchronized control method for a three-phase three-level boost-type rectifier, according to claim 1, characterized besides by including a sensor that acts over the waveform of the input current reference provoking an effective balance of the output voltages.

4. Synchronized control method for a three-phase three-level boost-type rectifier, according to claim 1, also characterized by including an analog switch (13) in each phase permits the interchange among the first and second triangular carriers.

5. Synchronized control method for a three-phase three-level boost-type rectifier, according to claim 1, characterized besides by the fact that the command signal of the switching devices is obtained by the comparison of the respective reference with the first and second triangular carriers.

6. Synchronized control method for a three-phase three-level boost-type rectifier, according to claim 1, characterized besides by the fact that the switching frequency is constant.

7. Synchronized control method for a three-phase three-level boost-type rectifier, according to claim 1, characterized by the fact that the output center point balance is achieved by adding the positive and negative output voltages and using the sum as an error signal to modify the current waveform reference.

8. Synchronized control method for a three-phase three-level boost-type rectifier, according to claim 7, characterized by an accurate regulation of the center point potential.

9. Synchronized control method for a three-phase three-level boost-type rectifier, according to claim 1, characterized by the fact that the modulating signals are fed together with the first and second triangular carriers having high frequencies to the pulse width modulator (14).

10. Synchronized control method for a three-phase three-level boost-type rectifier, according to claim 1, characterized by the fact that with the same switching frequency it generates eight states per period due to an appropriate distribution of the command pulses.

11. Synchronized control method for a three-phase three-level boost-type rectifier, according to claim 1, characterized by the fact that symmetrical charge of the capacitors can be expected because the proposed modulation technique is well symmetrical.

12. Synchronized control method for a three-phase three-level boost-type rectifier, according to claim 1, characterized by the fact that adds a quantity proportional to the deviation to the input current reference waveform, in such a way that a DC value will be added or subtracted to the modulating signal for the positive or negative halve cycle of mains voltage respectively.

* * * * *